United States Patent
Lee et al.

(10) Patent No.: US 9,571,853 B2
(45) Date of Patent: *Feb. 14, 2017

(54) METHOD AND APPARATUS FOR ENCODING AND DECODING MOTION VECTOR BASED ON REDUCED MOTION VECTOR PREDICTOR CANDIDATES

(71) Applicant: SAMSUNG ELECTRONICS CO., LTD., Suwon-si (KR)

(72) Inventors: Tammy Lee, Seoul (KR); Woo-jin Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/677,735

(22) Filed: Apr. 2, 2015

(65) Prior Publication Data

US 2015/0215639 A1    Jul. 30, 2015

Related U.S. Application Data

(63) Continuation of application No. 13/009,105, filed on Jan. 19, 2011.

(Continued)

(30) Foreign Application Priority Data

Jan. 14, 2011    (KR) .................. 10-2011-0004015

(51) Int. Cl.
    *H04N 19/56*    (2014.01)
    *H04N 19/52*    (2014.01)
    (Continued)

(52) U.S. Cl.
    CPC ............ *H04N 19/56* (2014.11); *H04N 19/172* (2014.11); *H04N 19/176* (2014.11); *H04N 19/46* (2014.11);
    (Continued)

(58) Field of Classification Search
    None
    See application file for complete search history.

(56) References Cited

U.S. PATENT DOCUMENTS 5,731,840 A    3/1998    Kikuchi et al.
5,737,022 A    4/1998    Yamaguchi et al.
(Continued)

FOREIGN PATENT DOCUMENTS

CN    102273206 A    12/2011
EP    1865727 A1    12/2007
(Continued)

OTHER PUBLICATIONS

Communication dated Sep. 20, 2011 issued by the International Searching Authority in International Application No. PCT/KR2011/000388.

(Continued)

*Primary Examiner* — Peter D Le
(74) *Attorney, Agent, or Firm* — Sughrue Mion, PLLC

(57) ABSTRACT

A method and apparatus for encoding and decoding a motion vector of a current block. The method of encoding including: generating information about the motion vector based on a motion vector of a current block and a motion vector predictor of the current block by estimating the motion vector and determining a first motion vector predictor candidate from among a plurality of motion vector predictor candidates as the motion vector predictor based on a result of the estimating; and generating a virtual motion vector by using a second motion vector predictor candidate and the information about the motion vector, generating vector differences between the virtual motion vector and the plurality of motion vector predictor candidates, comparing the vector differences with the information about the motion (Continued)

vector, and selectively excluding the second motion vector predictor candidate according to the comparing.

3 Claims, 15 Drawing Sheets

Related U.S. Application Data

(60) Provisional application No. 61/296,163, filed on Jan. 19, 2010.

(51) Int. Cl.
| | | |
|---|---|---|
| *H04N 19/61* | (2014.01) | |
| *H04N 19/46* | (2014.01) | |
| *H04N 19/503* | (2014.01) | |
| *H04N 19/51* | (2014.01) | |
| *H04N 19/172* | (2014.01) | |
| *H04N 19/176* | (2014.01) | |
| *H04N 19/513* | (2014.01) | |

(52) U.S. Cl.
CPC .......... *H04N 19/503* (2014.11); *H04N 19/51* (2014.11); *H04N 19/513* (2014.11); *H04N 19/52* (2014.11); *H04N 19/61* (2014.11)

(56) References Cited

U.S. PATENT DOCUMENTS

| | | | |
|---|---|---|---|
| 6,212,237 B1 | 4/2001 | Minami et al. | |
| 6,498,810 B1 | 12/2002 | Kim et al. | |
| 9,402,079 B2 | 7/2016 | Alshina et al. | |
| 2002/0075957 A1* | 6/2002 | Cho | H04N 19/517 375/240.12 |
| 2004/0013308 A1* | 1/2004 | Jeon | H04N 19/00533 382/236 |
| 2004/0028282 A1 | 2/2004 | Kato et al. | |
| 2004/0086047 A1* | 5/2004 | Kondo | H04N 19/521 375/240.16 |
| 2004/0264573 A1 | 12/2004 | Bossen | |
| 2005/0207494 A1 | 9/2005 | Ahn et al. | |
| 2006/0120612 A1 | 6/2006 | Manjunath et al. | |
| 2008/0037646 A1* | 2/2008 | Jeon | H04N 19/00533 375/240.16 |
| 2008/0056371 A1* | 3/2008 | Sekiguchi | H04N 19/105 375/240.17 |
| 2008/0080617 A1* | 4/2008 | Kodama | H04N 19/56 375/240.16 |
| 2008/0117977 A1 | 5/2008 | Lee et al. | |
| 2008/0159400 A1 | 7/2008 | Lee et al. | |
| 2008/0181309 A1 | 7/2008 | Lee et al. | |
| 2009/0010553 A1 | 1/2009 | Sagawa | |
| 2009/0147854 A1 | 6/2009 | Dane et al. | |
| 2009/0290643 A1 | 11/2009 | Yang | |
| 2009/0304084 A1 | 12/2009 | Hallapuro et al. | |
| 2009/0310682 A1* | 12/2009 | Chono | H04N 19/139 375/240.16 |
| 2011/0211640 A1 | 9/2011 | Kim et al. | |
| 2012/0213288 A1 | 8/2012 | Kitaura et al. | |
| 2014/0146888 A1 | 5/2014 | Takahashi et al. | |

FOREIGN PATENT DOCUMENTS

| | | |
|---|---|---|
| EP | 2664142 A1 | 11/2013 |
| JP | 11-112994 A | 4/1999 |
| JP | 2007-525100 A | 8/2007 |
| JP | 2008-211697 A | 9/2008 |
| JP | 2008-311987 A | 12/2008 |
| JP | 2010-10950 A | 1/2010 |
| JP | 2010-81465 A | 4/2010 |
| RU | 2344566 C1 | 1/2009 |
| WO | 2009/115901 A2 | 9/2009 |
| WO | 2010/002214 A2 | 1/2010 |
| WO | 2010050706 A2 | 5/2010 |
| WO | 2011/034148 A1 | 3/2011 |
| WO | 2011/048903 A1 | 4/2011 |
| WO | 2012/095466 A1 | 7/2012 |

OTHER PUBLICATIONS

Sung Kim et al., "A New Motion Vector Coding Technique Using Minimum Bitrate Prediction", Jan. 1, 2010; pp. 1-3.
Sung Kim, et al., "An Efficient Motion Vector Coding Scheme Based on Minimum Bitrate Prediction", Correspondence, IEEE Transactions on Image Processing, vol. 8, No. 8, Aug. 1999, pp. 1117-1999.
Communication dated Aug. 3, 2013 issued by the Australian Patent Office in counterpart Australian Application No. 2011207924.
Yao Wang, Motion Estimation for Video Coding, Multimedia Communications Systems II, EE4414: Motion Estimcation Basics, 2005, pp. 1-23.
Communication dated Nov. 25, 2013, issued by the Federal Service for Intellectual Property in counterpart Russian Application No. 2012135503.
Communication dated Jan. 3, 2014, issued by the European Patent Office in counterpart European Application No. 11734863.1.
Communication dated Oct. 14, 2014 issued by the State Intellectual Property Office of the People's Republic of China in counterpart Chinese Patent Application No. 201180006526.5.
Communication dated Oct. 28, 2014 issued by the Japanese Patent Office in counterpart Japanese Patent Application No. 2012-549943.
Yang, Motion Estimation for Video Coding, Sep. 29, 2003, Yao Yang, pp. 29.
Communication issued on Jul. 22, 2015 by the European Patent Office in related Application No. 11734863.1.
Communication issued on Jul. 20, 2015 by the European Patent Office in related Application No. 15161522.6.
Communication issued on Jun. 2, 2015 by the Japanese Patent Office in related Application No. 2012-549943.
Jung et al., "Competition-Based Scheme for Motion Vector Selection and Coding", ITU Telecommunications Standardization Sector STUDY GROUP 16 Question 6 Video Coding Experts Group, Jul. 17-18, 2006, 29th Meeting, VCEG-AC06, 8 total pages.
Communication dated Oct. 20, 2015, issued by the Japanese Intellectual Property Office in counterpart Japanese Application No. 2012-549943.
"Test Model under Consideration", Output Document (draft 007),Joint Collaborative Team on Video Coding (JCT-VC) of ITU-T SG16 WP3 and ISO/IEC JTC1/SC29/WG11, 2nd Meeting: Geneva, CH, Jul. 21-28, 2010, JCTVC-B205_draft 007, Total 39 pages.
Communication dated Sep. 6, 2016, from the Japanese Patent Office in counterpart application No. 2015-173092.

* cited by examiner

CODING UNIT (810)

PREDICTION UNIT (860)

METHOD AND APPARATUS FOR ENCODING AND DECODING MOTION VECTOR BASED ON REDUCED MOTION VECTOR PREDICTOR CANDIDATES

CROSS-REFERENCE TO RELATED PATENT APPLICATIONS

This is a continuation application of U.S. patent application Ser. No. 13/009,105, filed on Jan. 19, 2011 in the U.S. Patent and Trademark Office, which claims the benefit of U.S. Provisional Patent Application No. 61/296,163, filed on Jan. 19, 2010 in the U.S. Patent and Trademark Office, and claims priority from Korean Patent Application No. 10-2011-0004015, filed on Jan. 14, 2011 in the Korean Intellectual Property Office, the disclosures of which are incorporated herein in their entireties by reference.

BACKGROUND

1. Field

Apparatuses and methods consistent with exemplary embodiments relate to encoding and decoding a motion vector, and more particularly, to predictive encoding and decoding a motion vector of a current block.

2. Description of the Related Art

In a codec such as MPEG-4 H.264/MPEG-4 advanced video coding (AVC), motion vectors of previously encoded blocks adjacent to a current block may be used to predict a motion vector of the current block. A median of the motion vectors of the previously encoded blocks adjacent to a left side, an upper side, and a right upper side of the current block is used as a motion vector predictor of the current block. A motion vector of a current block is not directly encoded and instead, a difference between a motion vector and a motion vector predictor is encoded.

SUMMARY

One or more exemplary embodiments provide a method and apparatus for predictive encoding and decoding a motion vector, and a computer readable recording medium having recorded thereon a computer program for executing the method.

According to an aspect of an exemplary embodiment, there is provided a method of encoding a motion vector, the method including: generating information about the motion vector based on a motion vector of a current block and a motion vector predictor of the current block by estimating the motion vector of the current block and determining a first motion vector predictor candidate from among a plurality of motion vector predictor candidates as the motion vector predictor of the current block based on a result of the estimating; generating a virtual motion vector by using a second motion vector predictor candidate from among the plurality of motion vector predictor candidates and the information about the motion vector, generating vector differences between the virtual motion vector and the plurality of motion vector predictor candidates, comparing the vector differences with the information about the motion vector, and selectively excluding the second motion vector predictor candidate from among the plurality of motion vector predictor candidates; and encoding the information about the motion vector and information about the motion vector predictor of the current block.

According to an aspect of another exemplary embodiment, there is provided a method of decoding a motion vector, the method including: decoding information about a motion vector of a current block; generating a virtual motion vector by using a predetermined motion vector predictor candidate from among a plurality of motion vector predictor candidates and the decoded information about the motion vector, generating vector differences between the virtual motion vector and the plurality of motion vector predictor candidates, comparing the generated vector differences with the decoded information about the motion vector, and selectively excluding the predetermined motion vector predictor candidate from among the plurality of motion vector predictor candidates; and determining a motion vector predictor of motion vector predictor candidates that are not excluded from among the plurality of motion vector predictor candidates as a motion vector predictor of the current block and restoring the motion vector of the current block based on the determined motion vector predictor and the decoded information about a motion vector.

According to an aspect of another exemplary embodiment, there is provided an apparatus for encoding a motion vector, the apparatus including: a motion vector estimator which generates information about the motion vector based on a motion vector of a current block and a motion vector predictor of the current block by estimating the motion vector of the current block and determines a first motion vector predictor candidate from among a plurality of motion vector predictor candidates as the motion vector predictor of the current block based on a result of the estimating; a candidate determiner which generates a virtual motion vector by using a second motion vector predictor candidate from among the plurality of motion vector predictor candidates and the information about the motion vector, generates vector differences between the virtual motion vector and the plurality of motion vector predictor candidates, compares the vector differences with the information about the motion vector, and selectively excludes the second motion vector predictor candidate from among the plurality of motion vector predictor candidates; and a motion vector encoder which encodes the information about the motion vector and information about the motion vector predictor of the current block.

According to an aspect of another exemplary embodiment, there is provided an apparatus for decoding a motion vector, the apparatus including: a motion vector decoder which decodes information about a motion vector of a current block; a candidate determiner which generates a virtual motion vector by using a predetermined motion vector predictor candidate from among a plurality of motion vector predictor candidates and the decoded information about the motion vector, generates vector differences between the virtual motion vector and the plurality of motion vector predictor candidates, compares the generated vector differences with the decoded information about the motion vector, and selectively excludes the predetermined motion vector predictor candidate from among the plurality of motion vector predictor candidates; and a motion vector restoring unit which determines a motion vector predictor candidate of motion vector predictor candidates that are not excluded from among the plurality of motion vector predictor candidates as a motion vector predictor of the current block and restores the motion vector of the current block based on the determined motion vector predictor and the decoded information about the motion vector.

According to an aspect of another exemplary embodiment, there is provided a computer readable recording medium having embodied thereon a computer program for executing the methods of encoding and decoding a motion vector.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Hereinafter, one or more exemplary embodiments will be described more fully with reference to the accompanying drawings. Expressions such as "at least one of," when preceding a list of elements, modify the entire list of elements and do not modify the individual elements of the list.

Hereinafter, an 'image' may denote a still image for a video or a moving image, that is, the video itself.

Figure 1:
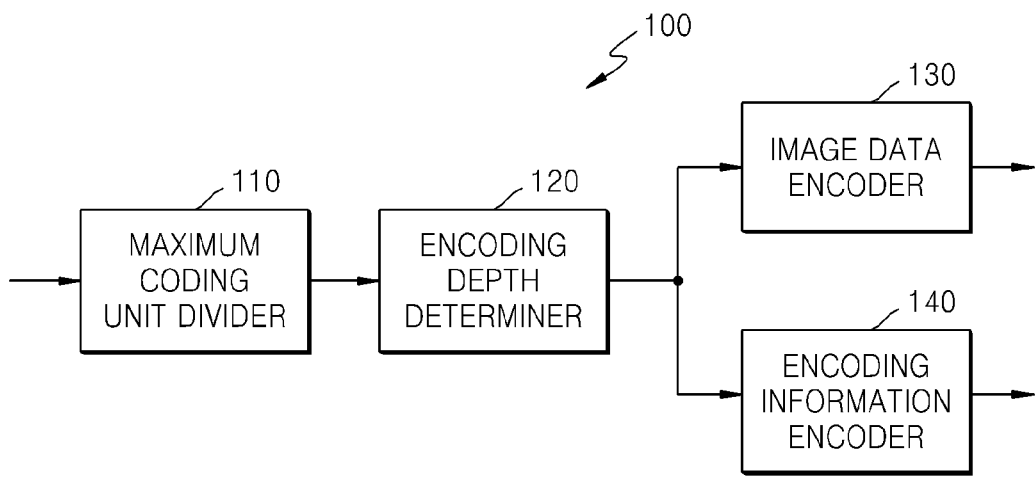
FIG. 1 is a block diagram of an apparatus for encoding an image, according to an exemplary embodiment.

FIG. 1 is a block diagram of an apparatus 100 for encoding an image, according to an exemplary embodiment.

Referring to FIG. 1, the apparatus 100 for encoding an image includes a maximum coding unit divider 110, an encoding depth determiner 120, an image data encoder 130, and an encoding information encoder 140.

The maximum coding unit divider 110 may divide a current frame or slice based on a maximum coding unit that is a coding unit of the largest size. That is, the maximum coding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a kth depth may include a plurality of sub coding units of a (k+n)th depth (k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ratio may increase. However, when a complex area such as people or buildings is encoded, the smaller a coding unit is, the more a compression ratio may increase.

Accordingly, according to an exemplary embodiment, a different maximum coding unit and a different maximum depth may be set for each frame or slice. Since a maximum depth denotes the maximum number of times by which a coding unit may decrease, the size of each minimum coding unit included in a maximum coding unit may be variably set according to a maximum depth.

The encoding depth determiner 120 determines a maximum depth. The maximum depth may be determined based on calculation of rate-distortion (RD) costs. The maximum depth may be determined differently for each frame or slice or for each maximum coding unit. The determined maximum depth is provided to the encoding information encoder 140, and image data according to maximum coding units is provided to the image data encoder 130.

The maximum depth may denote a coding unit having the smallest size that may be included in a maximum coding unit, that is, a minimum coding unit. In other words, the maximum coding unit may be divided into sub coding units having different sizes according to different depths, as will be described later with reference to FIGS. 8A and 8B. Also, the sub coding units having different sizes, which are included in the maximum coding unit, may be predicted or transformed based on processing units having different sizes. The transform is performed to transform pixel values of a spatial domain to coefficients of a frequency domain and may be discrete cosine transform or Karhunen Loever transform (KLT). In other words, the apparatus 100 for encoding an image may perform a plurality of processing operations for image encoding based on processing units having various sizes and various shapes. To encode image data, processing operations such as at least one of prediction, transform, and entropy encoding are performed, wherein processing units having the same size or different sizes may be used for every operation.

For example, the apparatus 100 for encoding an image may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of height and width of a coding unit is equally divided by two. Hereinafter, a processing unit, which is the base of prediction, is defined as a 'prediction unit'.

A prediction mode may be at least one of an intra mode, an inter mode, and a skip mode, and a specific prediction mode may be performed for only a prediction unit having a specific size or shape. For example, the intra mode may be performed for only prediction units having the sizes of 2N×2N and N×N of which the shape is a square. Further, the skip mode may be performed for only a prediction unit having the size of 2N×2N. If a plurality of prediction units exist in a coding unit, the prediction mode with the least encoding errors may be selected after performing prediction for every prediction unit.

Alternatively, the apparatus 100 for encoding an image may perform transform on image data based on a processing unit having a different size from a coding unit. For the transform in the coding unit, the transform may be performed based on a processing unit having a size equal to or smaller than that of the coding unit. Hereinafter, a processing unit, which is the base of transform, is defined as a 'transform unit'.

The encoding depth determiner 120 may determine sub coding units included in a maximum coding unit using RD optimization based on a Lagrangian multiplier. In other words, the encoding depth determiner 120 may determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be information indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded. The information indicating whether the sub coding unit is divided may be flag information.

Since sub coding units having different sizes exist for each maximum coding unit and information about an encoding mode must be determined for each sub coding unit, information about at least one encoding mode may be determined for one maximum coding unit.

The apparatus 100 for encoding an image may generate sub coding units by equally dividing both height and width of a maximum coding unit by two according to an increase of depth. That is, when the size of a coding unit of a kth depth is 2N×2N, the size of a coding unit of a (k+1)th depth is N×N.

Accordingly, the apparatus 100 for encoding an image may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
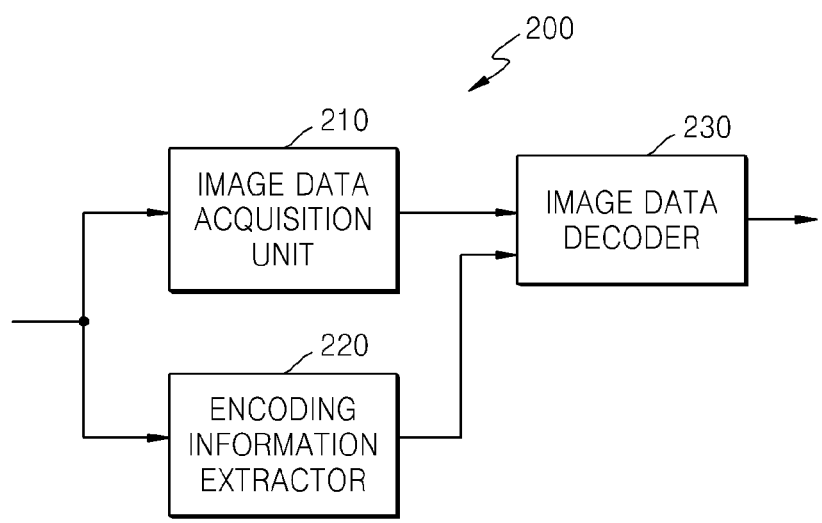
FIG. 2 is a block diagram of an apparatus for decoding an image, according to an exemplary embodiment.

FIG. 2 is a block diagram of an apparatus 200 for decoding an image, according to an exemplary embodiment.

Referring to FIG. 2, the apparatus 200 for decoding an image includes an image data acquisition unit 210, an encoding information extractor 220, and an image data decoder 230.

The image data acquisition unit 210 acquires image data according to maximum coding units by parsing a bitstream received by the apparatus 200 for decoding an image and outputs the image data to the image data decoder 230. The image data acquisition unit 210 may extract information about a maximum coding unit of a current frame or slice from a header of the current frame or slice. In other words, the image data acquisition unit 210 divides the bitstream in the maximum coding unit so that the image data decoder 230 may decode the image data according to maximum coding units.

The encoding information extractor 220 extracts information about a maximum coding unit, a maximum depth, a division shape of the maximum coding unit, an encoding mode of sub coding units from the header of the current frame by parsing the bitstream received by the apparatus 200 for decoding an image. The information about a division shape and the information about an encoding mode are provided to the image data decoder 230.

The information about a division shape of the maximum coding unit may include information about sub coding units having different sizes according to depths and included in the maximum coding unit, and may be information (e.g., flag information) indicating whether each coding unit is divided. The information about an encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include an inter prediction process including intra prediction and motion compensation and an inverse transform process.

The image data decoder 230 may perform intra prediction or inter prediction based on information about a prediction unit according to sub coding units and information about a prediction mode in order to predict a sub coding unit. The image data decoder 230 may also perform inverse transform for each sub coding unit based on information about a transform unit of a sub coding unit.

Figure 3:
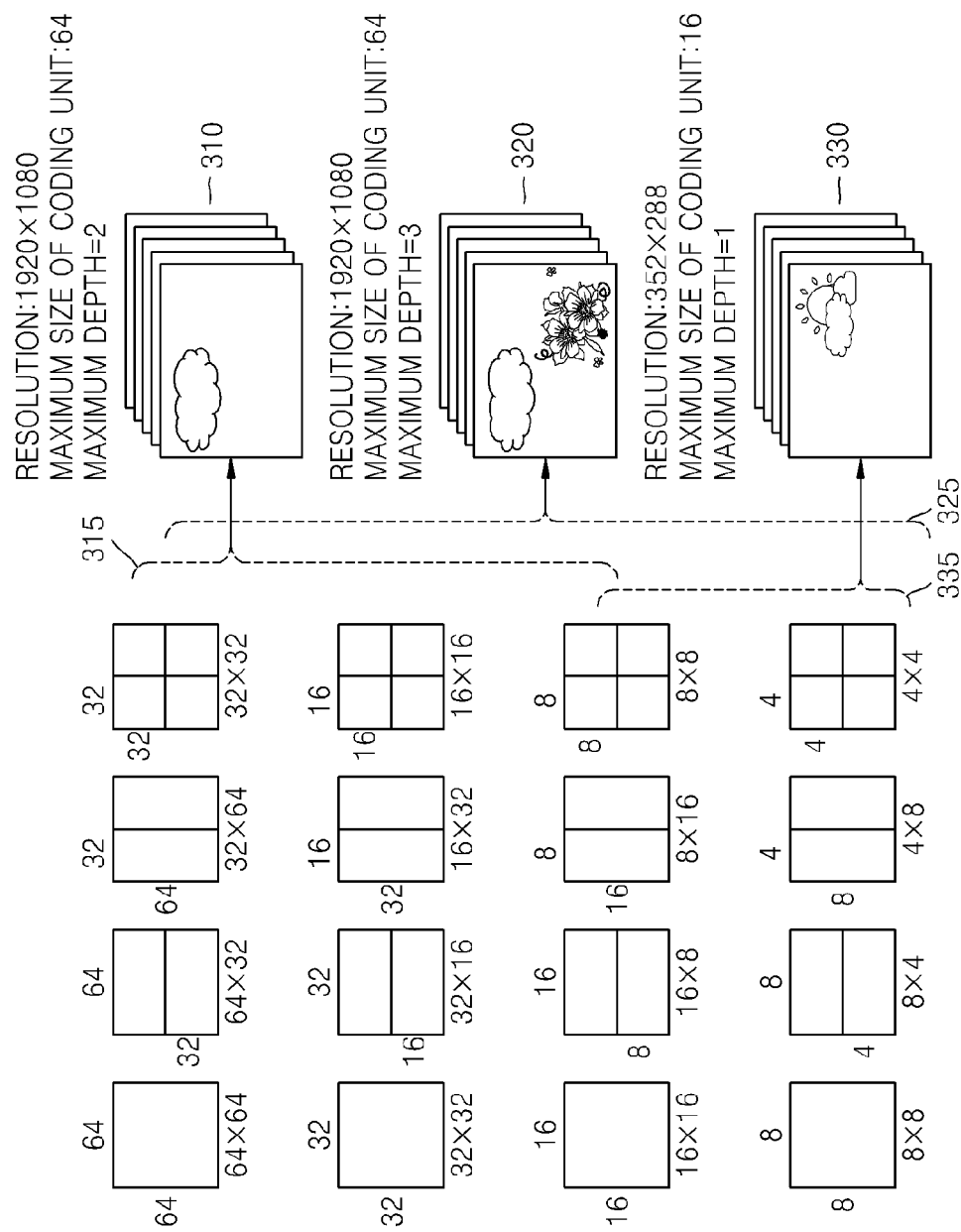
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose width×heights are 64×64, 32×32, 16×16, 8×8, and 4×4. Besides these coding units having perfect square shapes, coding units whose width× heights are 64×32, 32×64, 32×16, 16×32, 16×8, 8×16, 8×4, and 4×8 may also exist In FIG. 3, for image data 310 whose resolution is 1920× 1080, the size of a maximum coding unit is set to 64×64, and a maximum depth is set to 2

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 2.

When the resolution is high or the amount of data is great, a maximum size of a coding unit may be relatively great to increase a compression ratio and exactly reflect image characteristics. Accordingly, for the image data 310 and 320 having higher resolution than the image data 330, 64×64 may be selected as the size of a maximum coding unit.

A maximum depth indicates the total number of layers in the hierarchical coding units. Since the maximum depth of the image data 310 is 2, a coding unit 315 of the image data 310 may include a maximum coding unit whose longer axis size is 64 and sub coding units whose longer axis sizes are 32 and 16, according to an increase of a depth.

On the other hand, since the maximum depth of the image data 330 is 2, a coding unit 335 of the image data 330 may include a maximum coding unit whose longer axis size is 16 and coding units whose longer axis sizes are 8 and 4, according to an increase of a depth.

However, since the maximum depth of the image data 320 is 4, a coding unit 325 of the image data 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, an exemplary embodiment is suitable for encoding an image including more minute scenes.

Figure 4:
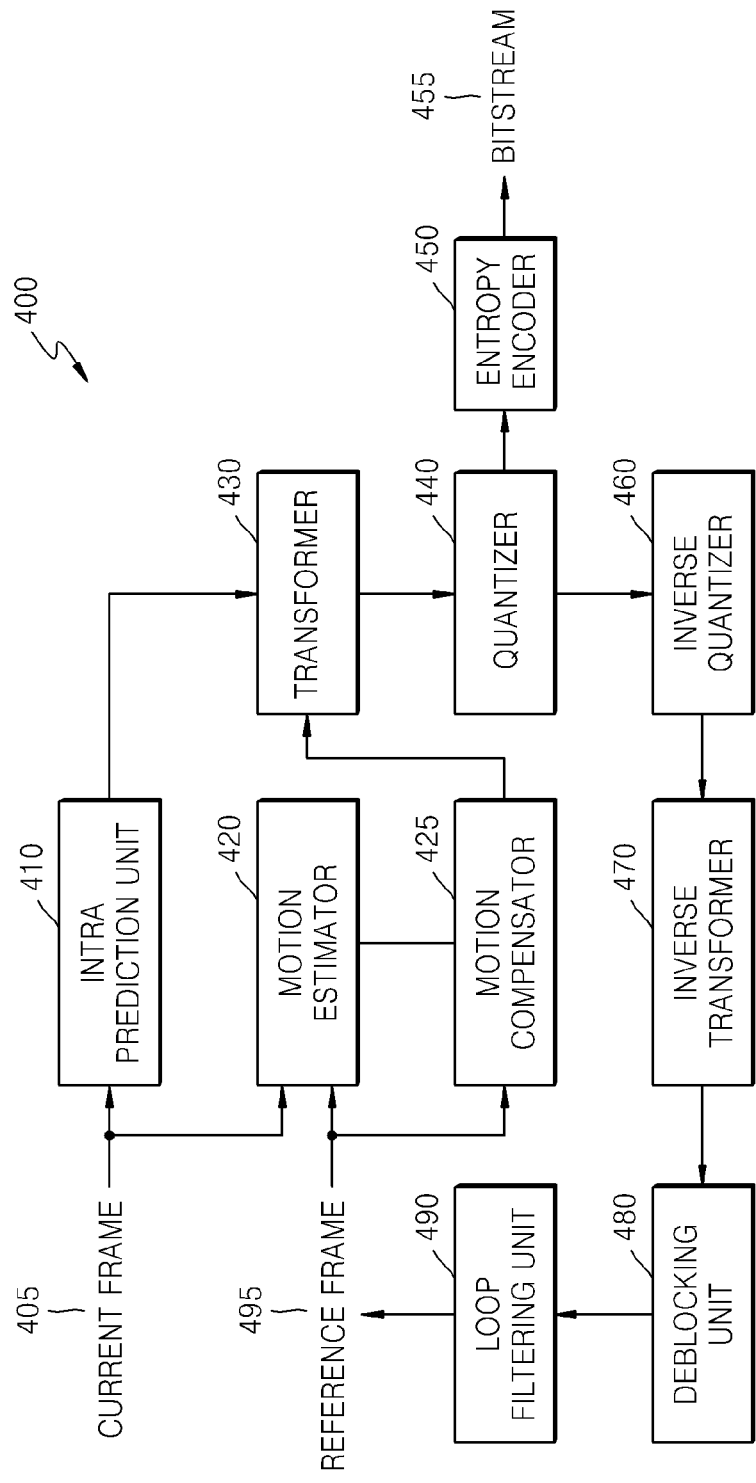
FIG. 4 is a block diagram of an image encoder based on a coding unit, according to an exemplary embodiment.

FIG. 4 is a block diagram of an image encoder 400 based on a coding unit, according to an exemplary embodiment.

An intra prediction unit 410 performs intra prediction on prediction units of the intra mode in a current frame 405, and a motion estimator 420 and a motion compensator 425 perform inter prediction and motion compensation on prediction units of the inter mode using the current frame 405 and a reference frame 495.

Residual values are generated based on the prediction units output from the intra prediction unit 410, the motion estimator 420, and the motion compensator 425, and the generated residual values are output as quantized transform coefficients by passing through a transformer 430 and a quantizer 440.

The quantized transform coefficients are restored to residual values by passing through an inverse quantizer 460 and an inverse transformer 470, and the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, components of the image encoder 400, i.e., the intra prediction unit 410, the motion estimator 420, the motion compensator 425, the transformer 430, the quantizer 440, the entropy encoder 450, the inverse quantizer 460, the inverse transformer 470, the deblocking unit 480 and the loop filtering unit 490, perform image encoding processes based on a maximum coding unit, a sub coding unit according to depths, a prediction unit, and a transform unit.

Figure 5:
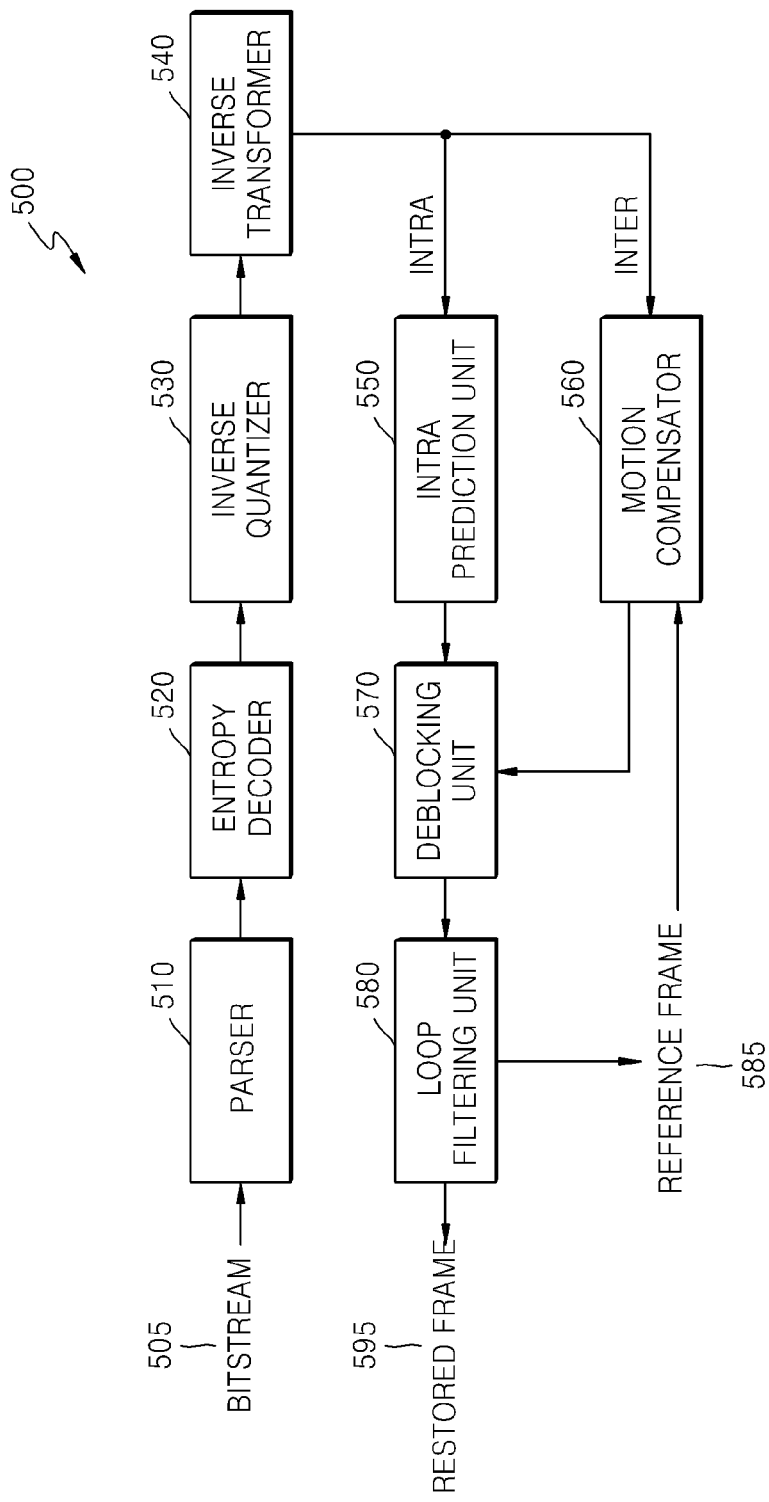
FIG. 5 is a block diagram of an image decoder based on a coding unit, according to an exemplary embodiment.

FIG. 5 is a block diagram of an image decoder 500 based on a coding unit, according to an exemplary embodiment.

Referring to FIG. 5, a bitstream 505 passes through a parser 510 so that encoded image data to be decoded and encoding information used for decoding are parsed. The encoded image data is output as inverse-quantized data by passing through an entropy decoder 520 and an inverse quantizer 530 and restored to residual values by passing through an inverse transformer 540. The residual values are restored according to coding units by being added to an intra prediction result of an intra prediction unit 550 or a motion compensation result of a motion compensator 560. The restored coding units are used for prediction of next coding units or a next frame by passing through a deblocking unit 570 and a loop filtering unit 580.

To perform decoding based on a decoding method according to an exemplary embodiment, components of the image decoder 500, i.e., the parser 510, the entropy decoder 520, the inverse quantizer 530, the inverse transformer 540, the intra prediction unit 550, the motion compensator 560, the deblocking unit 570 and the loop filtering unit 580, perform image decoding processes based on a maximum coding unit, a sub coding unit according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
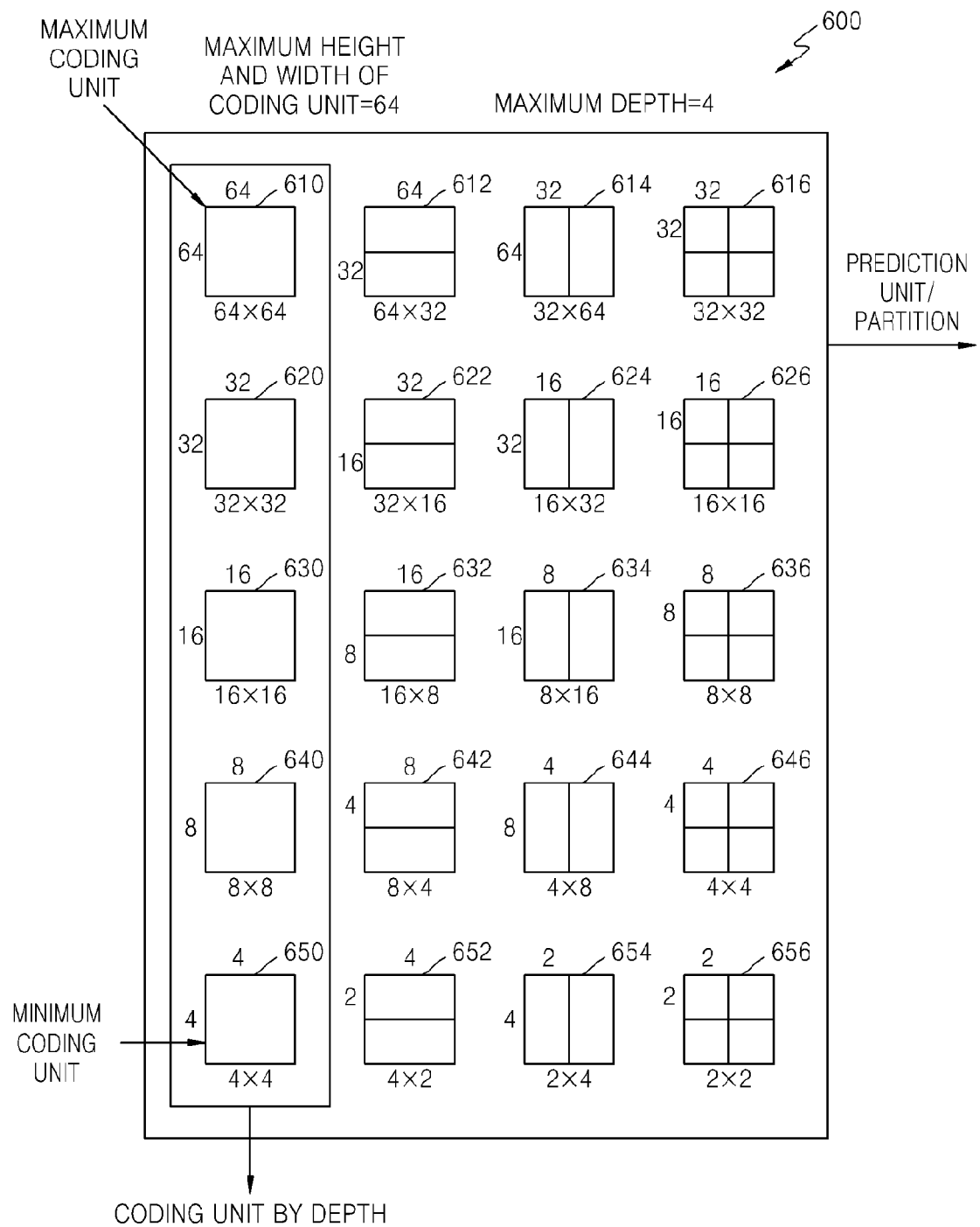
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The apparatus 100 for encoding an image illustrated in FIG. 1 and the apparatus 200 for decoding an image illustrated in FIG. 2 use hierarchical coding units to perform encoding and decoding in consideration of image characteristics. A maximum coding unit and a maximum depth may be adaptively set according to the image characteristics or variably set according to requirements of a user.

In FIG. 6, a hierarchical coding unit structure 600 has a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

Finally, the coding unit 650 whose depth is 4 and size is 4×4 is a coding unit of a maximum depth, and a prediction unit of the coding unit 650 may be a prediction unit 650 whose size is 4×4. However, the coding unit of a maximum depth may not be always the same as the size of the prediction unit. Similar to the coding units 610 through 650, the coding unit of a maximum depth may be divided into prediction units having smaller sizes than the coding unit and may perform prediction.

Figure 7:
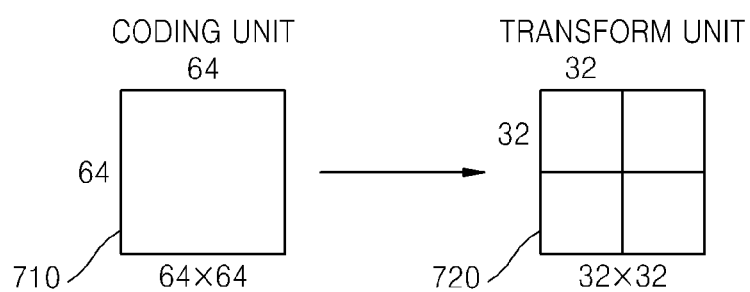
FIG. 7 illustrates a coding unit and a transform unit, according to an exemplary embodiment.

FIG. 7 illustrates a coding unit and a transform unit, according to an exemplary embodiment.

The apparatus 100 for encoding an image illustrated in FIG. 1 and the apparatus 200 for decoding an image illustrated in FIG. 2 perform encoding and decoding with a maximum coding unit itself or with sub coding units, which are equal to or smaller than the maximum coding unit, divided from the maximum coding unit. In the encoding and decoding process, the size of a transform unit for transform is selected to be for the highest compression ratio regardless of the coding unit and the prediction unit. For example, referring to FIG. 7, when a current coding unit 710 has the size of 64×64, transform may be performed using a transform unit 720 having the size of 32×32.

FIGS. 8A through 8D illustrate division shapes of a coding unit 810, a prediction unit 860, and a transform unit 870, according to an exemplary embodiment.

Figure 8A:
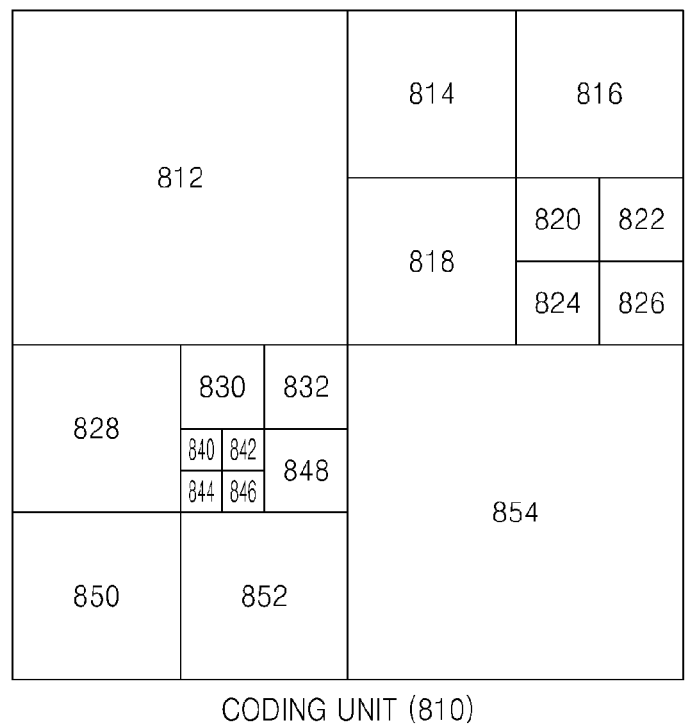
FIGS. 8A through 8D illustrate division shapes of a coding unit, a prediction unit, and a transform unit, according to an exemplary embodiment.
Figure 8B:
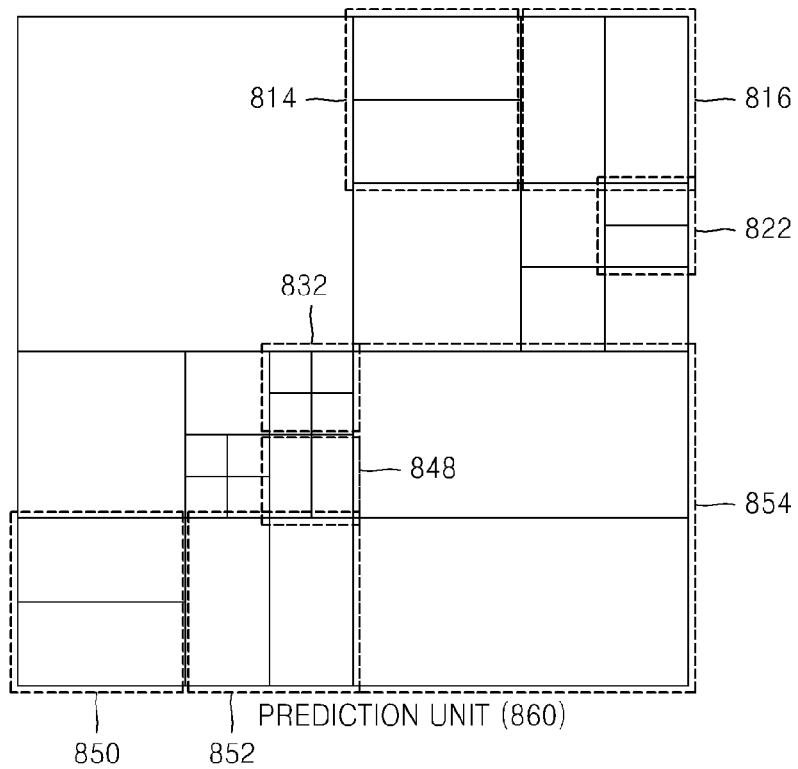

FIGS. 8A and 8B illustrate a coding unit 810 and a prediction unit 860, according to an exemplary embodiment.

FIG. 8A shows a division shape selected by the apparatus 100 for encoding an image illustrated in FIG. 1, in order to encode a maximum coding unit 810. The apparatus 100 for encoding an image divides the maximum coding unit 810 into various shapes, performs encoding, and selects an optimal division shape by comparing encoding results of various division shapes with each other based on RD costs. When it is optimal that the maximum coding unit 810 is encoded as it is, the maximum coding unit 810 may be encoded without dividing the maximum coding unit 810 as illustrated in FIGS. 8A through 8D.

Referring to FIG. 8B, the maximum coding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

FIG. 8B shows a division shape of a prediction unit 860 for the maximum coding unit 810.

Referring to FIG. 8B, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units whose depths are 1 may be smaller than the sub coding unit 854. In addition, prediction units for some sub coding units 814, 816, 850, and 852 from among sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
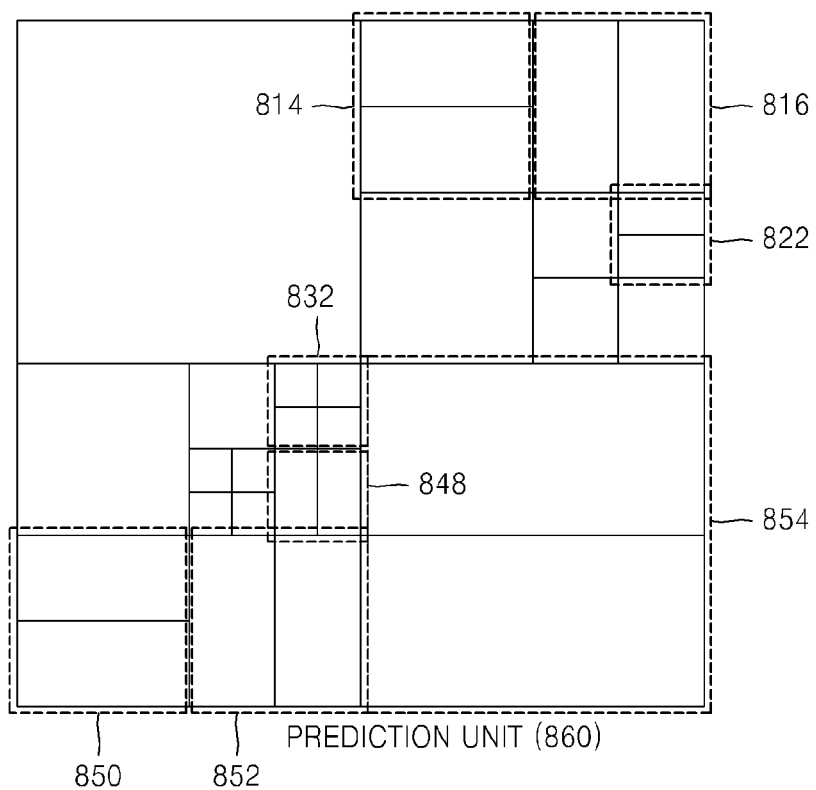
Figure 8D:
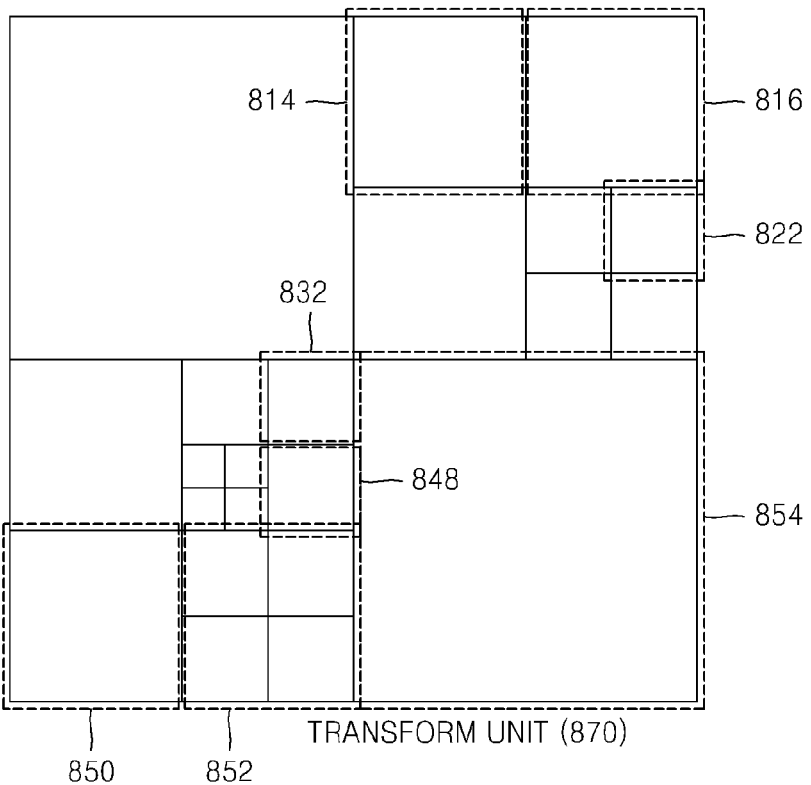

FIGS. 8C and 8D illustrate a prediction unit 860 and a transform unit 870, according to an exemplary embodiment.

FIG. 8C shows a division shape of a prediction unit 860 for the maximum coding unit 810 shown in FIG. 8B, and FIG. 8D shows a division shape of a transform unit 870 of the maximum coding unit 810.

Referring to FIG. 8D, a division shape of a transform unit 870 may be set differently from the prediction unit 860.

For example, even though a prediction unit for the coding unit 854 whose depth is 1 is selected with a shape whereby the height of the coding unit 854 is equally divided by two, a transform unit may be selected with the same size as the coding unit 854. Likewise, even though prediction units for coding units 814 and 850 whose depths are 2 are selected with a shape whereby the height of each of the coding units 814 and 850 is equally divided by two, a transform unit may be selected with the same size as the original size of each of the coding units 814 and 850.

A transform unit may be selected with a smaller size than a prediction unit. For example, when a prediction unit for the coding unit 852 whose depth is 2 is selected with a shape whereby the width of the coding unit 852 is equally divided by two, a transform unit may be selected with a shape whereby the coding unit 852 is equally divided by four in directions of height and width, which has a smaller size than the shape of the prediction unit.

Figure 9:
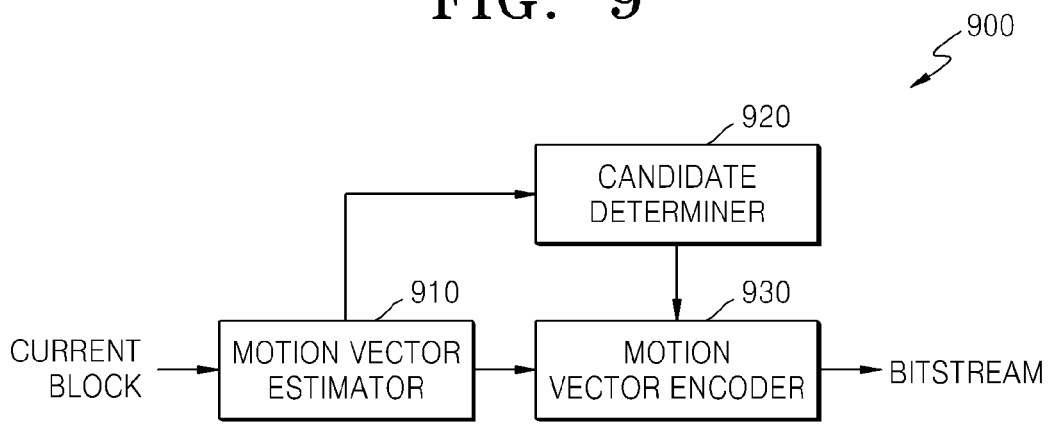
FIG. 9 is a block diagram of an apparatus for encoding a motion vector, according to an exemplary embodiment.

FIG. 9 is a block diagram of an apparatus 900 for encoding a motion vector, according to an exemplary embodiment.

The apparatus 900 for encoding a motion vector may be included in the apparatus 100 for encoding an image illustrated in FIG. 1 or the image encoder 400 illustrated in FIG. 4 is illustrated in detail in FIG. 9. Referring to FIG. 9, the apparatus 900 for encoding a motion vector includes a motion vector estimator 910, a candidate determiner 920, and a motion vector encoder 930.

In order to decode encoded blocks by using inter prediction, that is, temporal prediction, information about a motion vector that indicates a relative location difference between a current block and a similar block in a reference picture is needed. Accordingly, information about a motion vector is encoded while image encoding and is inserted into a bitstream. When the information about a motion vector is directly encoded and inserted, an overhead used to encode the information about a motion vector increases and thus compression ratio of image data is lowered.

Accordingly, in image encoding, a motion vector of a current block is predicted, and an original motion vector difference between a motion vector predictor generated as a result of prediction and an original motion vector is only encoded and is inserted so that information about a motion vector is compressed.

In predictive encoding of a motion vector, an explicit mode and an implicit mode may exist.

In a codec such as MPEG-4 H.264/MPEG-4 advanced video coding (AVC), motion vectors of previously encoded blocks adjacent to a current block may be used to predict a motion vector of the current block. A median of the motion vectors of the previously encoded blocks adjacent to a left side, an upper side, and a right upper side of the current block is used as a motion vector predictor of the current block. Since motion vectors of all blocks encoded using inter prediction are predicted by using the same method, information about a motion vector predictor of a current block may not be separately encoded. However, the apparatus 100 for encoding an image or the image encoder 400 according to one or more exemplary embodiments uses both an implicit mode, in which information about a motion vector predictor is not separately encoded, and an explicit mode, in which information about a motion vector predictor is not encoded, so as to accurately predict a motion vector. In the explicit mode, information about a motion vector predictor used as a motion vector predictor of a current block from among a plurality of motion vector predictor candidates is encoded and is inserted into a bitstream as a sequence parameter, a slice parameter, or a block parameter.

FIG. 9 illustrates an apparatus which performs predictive encoding while a motion vector is encoded according to an explicit mode.

The motion vector estimator 910 estimates a motion vector of a current block. A block similar to or same as a current block is searched in at least one reference picture and as a result of searching, a motion vector, which is a relative location difference between the current block and the searched reference picture, is estimated. A block similar to or same as the current block is searched based on calculation of a sum of absolute difference (SAD) and as a result of searching, a motion vector of the current block may be estimated.

Also, the motion vector estimator 910 predicts a motion vector of the current block based on motion vectors of blocks included in a previously encoded area adjacent to the current block. In other words, the motion vectors of the blocks included in the previously encoded area adjacent to the current block are set to be motion vector predictor candidates, and a motion vector predictor candidate that is most similar to an estimated motion vector of a current block from among the motion vector predictor candidates is determined.

In codec such as MPEG-4 H.264/MPEG-4 AVC, a median of the motion vectors of the previously encoded blocks adjacent to a left side, an upper side, and a right upper side of the current block is used as a motion vector predictor of the current block. Since a motion vector of an encoded block is predicted by using the motion vectors of the previously encoded blocks and only one motion vector predictor is used, information about a motion vector predictor may not be separately encoded. In other words, the number of motion vector predictors of a block encoded using inter prediction is one.

However, when a motion vector of a current block is accurately predicted, the motion vector may be encoded with a high compression ratio. In this regard, according to an exemplary embodiment, one of a plurality of motion vector predictor candidates is selected and used as a motion vector predictor of a current block so that a motion vector of a current block is encoded with high compression ratio. Hereinafter, a method of encoding a motion vector of a current block by using a plurality of motion vector predictor candidates will be describe in detail.

Figure 10A:
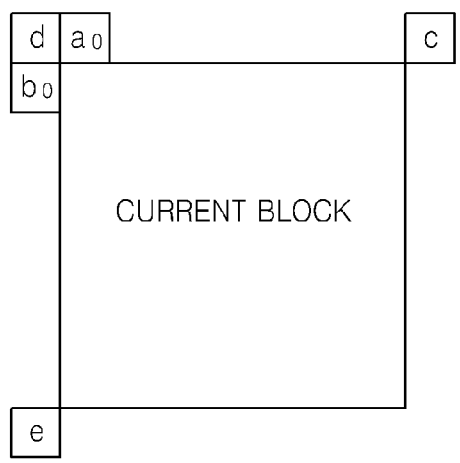
FIGS. 10A and 10B illustrate motion vector predictor candidates, according to an exemplary embodiment.
Figure 10B:
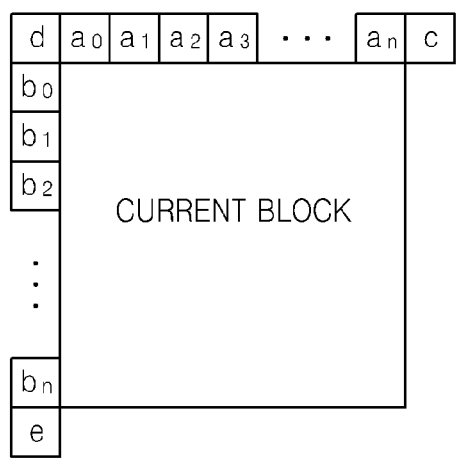

FIGS. 10A and 10B illustrate motion vector predictor candidates, according to an exemplary embodiment.

Referring to FIG. 10A, in a method of predicting a motion vector, one of motion vectors of previously encoded blocks adjacent to a current block may be used as a motion vector predictor of the current block.

From among blocks adjacent to an upper side of a current block, all motion vectors of a block a0 at a leftmost side, a block b0 at an uppermost side adjacent to the left side, a block c adjacent to a right upper side, a block d adjacent to a left upper side, and a block e adjacent to a left lower side may be used as motion vector predictor candidates of the current block.

In a method of encoding and decoding an image according to one or more exemplary embodiments, image encoding and decoding are performed based on coding units having various sizes classified by depths and thus a motion vector of the block adjacent to the left lower side may be used as a candidate of the motion vector predictor.

Referring to FIG. 10B, motion vectors of all blocks adjacent to a current block may be used as motion vector predictor candidates. In other words, motion vectors of not only the block a0 at the leftmost side from among the blocks adjacent to the upper side but also all blocks a0 through aN adjacent to the upper side may be used as motion vector predictor candidates. Also, motion vectors of not only the block b0 at the uppermost side from among the blocks adjacent to the left side but also all blocks b0 through bN adjacent to the left side may be used as motion vector predictor candidates.

In addition, a median of motion vectors of adjacent blocks may be used as motion vector predictor candidates. In other words, a median mv_a0, mv_b0, or mv_c may be used as a candidate of a motion vector predictor of the current block. Here, mv_a0 is a motion vector of the block a0, mv_b0 is a motion vector of the block b0, and mv_c is a motion vector of the block c.

However, motion vector predictor candidates of the current block may be restricted according to sizes of the current block and adjacent blocks, as will be described in detail with reference to FIGS. 10C through 10E.

Figure 10C:
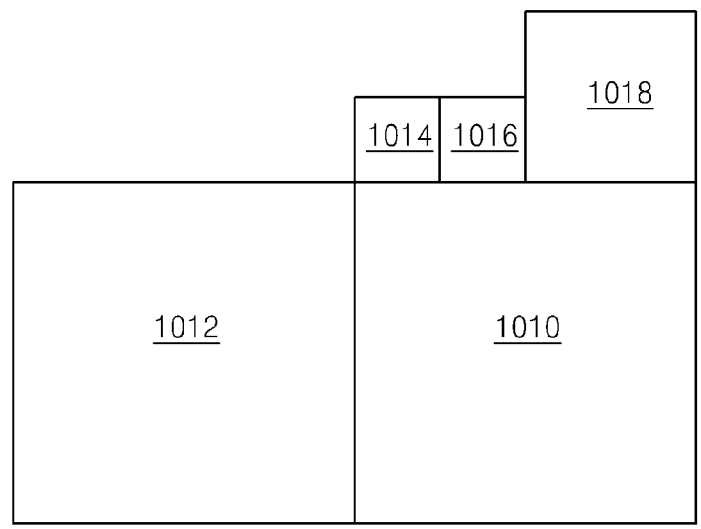
FIGS. 10C through 10E illustrate blocks having various sizes that are adjacent to a current block, according to an exemplary embodiment.
Figure 10D:
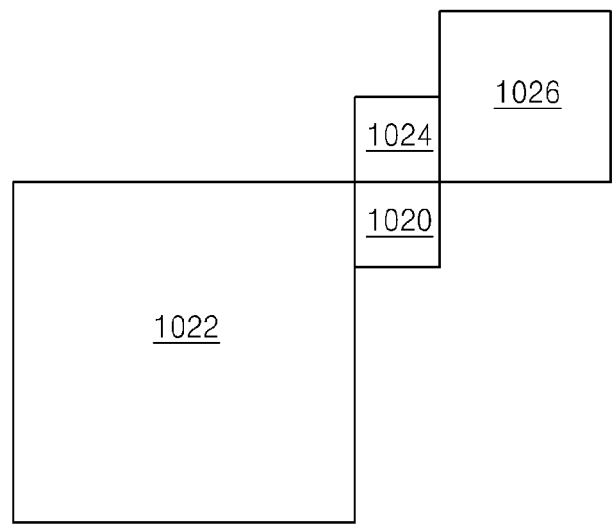
Figure 10E:
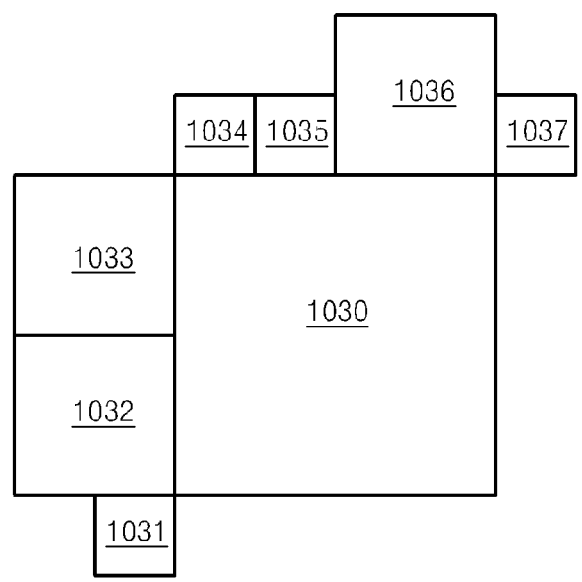

FIGS. 10C through 10E illustrate blocks having various sizes that are adjacent to a current block, according to an exemplary embodiment.

As described above, in the method of encoding and decoding an image according to one or more exemplary embodiments, coding units and prediction unit having various sizes determined according to depths may be used to encode an image. Accordingly, since blocks adjacent to the current block may be of various sizes, when a size of the current block and sizes of some adjacent blocks are significantly different from each other, motion vectors of the some adjacent blocks may not be used as motion vector predictor candidates.

Referring to FIG. 10C, blocks 1014 through 1018 adjacent to an upper side of a current block 1010 are smaller than the current block 1010. Since a motion vector of a block 1012 adjacent to the current block 1010 and having the same size as the current block 1010 may be the same or similar to a motion vector of the current block 1010, the motion vector estimator 910 may only use the motion vector of the block 1012 as a candidate of a motion vector predictor.

Although sizes are not the same, motion vectors of adjacent blocks having predetermined sizes or above may be only used as motion vector predictor candidates. For example, the motion vectors of the blocks 1012 and 1018 having sizes ¼ times the current block 1010 or above may be only used as motion vector predictor candidates.

Referring to FIG. 10D, a size of a block 1022 adjacent to a left side of a current block 1020 is larger than a size of the current block 1020 by 16 times so that there exists a great difference in sizes. Due to the great difference, a motion vector of the block 1022 adjacent to the left side may not be the same as or similar to a motion vector of the current block 1020. Accordingly, the motion vector of the block 1022 adjacent to the left side is not used as a motion vector predictor candidate of the current block 1020 and only motion vectors of a block 1024 adjacent to an upper side and a block 1026 adjacent to a left upper side may be used as motion vector predictor candidates.

Referring to FIG. 10E, a size of a current block 1030 is larger than sizes of all adjacent blocks 1031 through 1037. Here, when motion vectors of all adjacent blocks 1031 through 1037 are used as motion vector predictor candidates of the current block 1030, the number of the motion vector predictor candidates of the current block 1030 may be high. As a size difference between the current block 1030 and the adjacent blocks 1031 through 1037 increases, the number of the motion vector predictor candidates also increases. Accordingly, the motion vector estimator 910 may not use motion vectors of some blocks from among the adjacent blocks as the motion vector predictor candidates of the current block 1030.

For example, in FIG. 10E, the motion vectors of the block 1031 adjacent to the left lower side and the block 1037 adjacent to the right upper side may not be used as motion vector predictor candidates of the current block 1030.

More generally, when a size of the current block 1030 is above a predetermined size, motion vectors of blocks adjacent in a specific direction from among adjacent blocks may not be used as motion vector predictor candidates of the current block 1030.

Figure 11A:
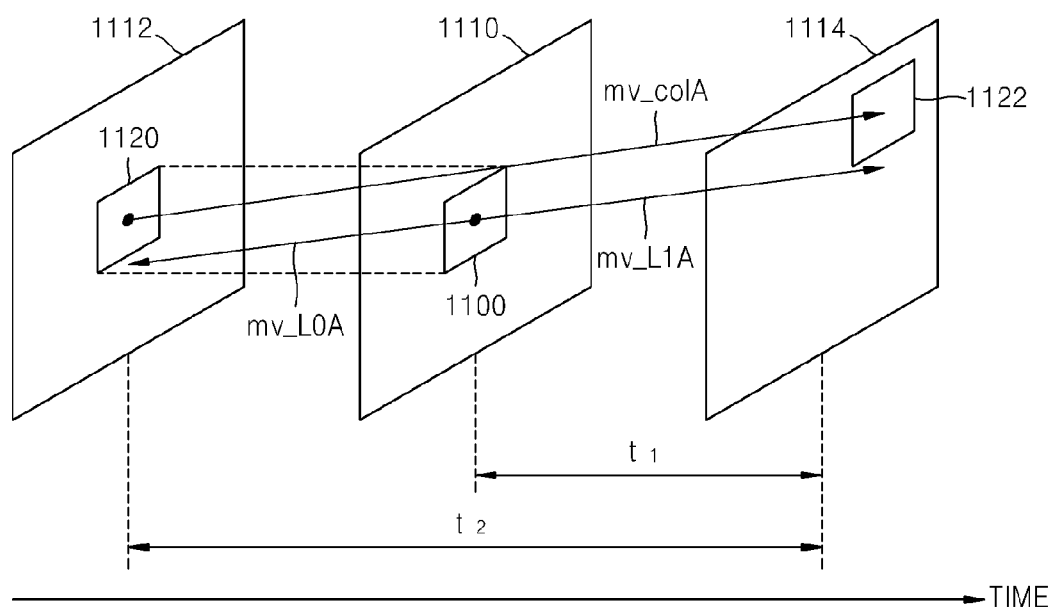
FIGS. 11A through 11C illustrate motion vector predictor candidates, according to another exemplary embodiment.
Figure 11B:
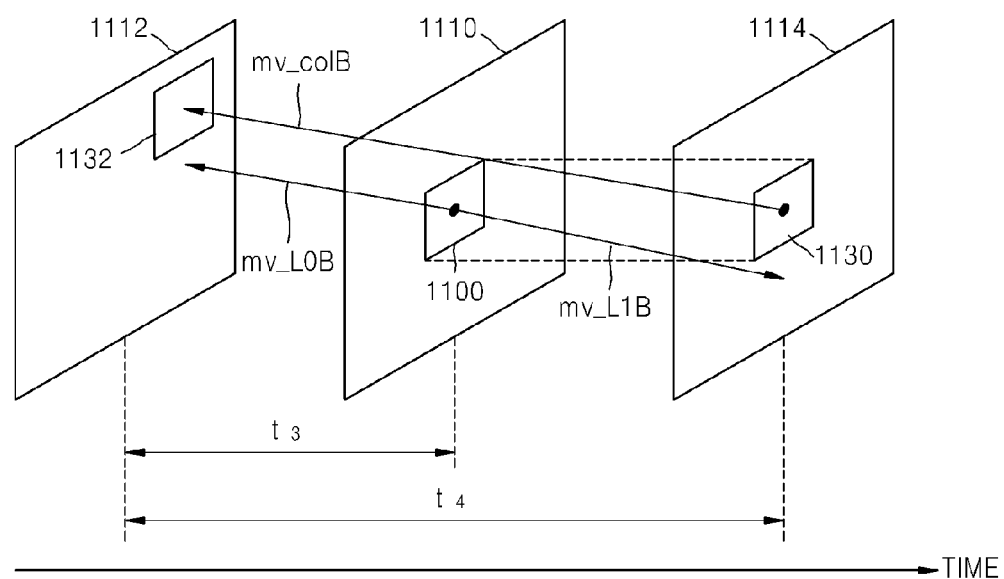
Figure 11C:
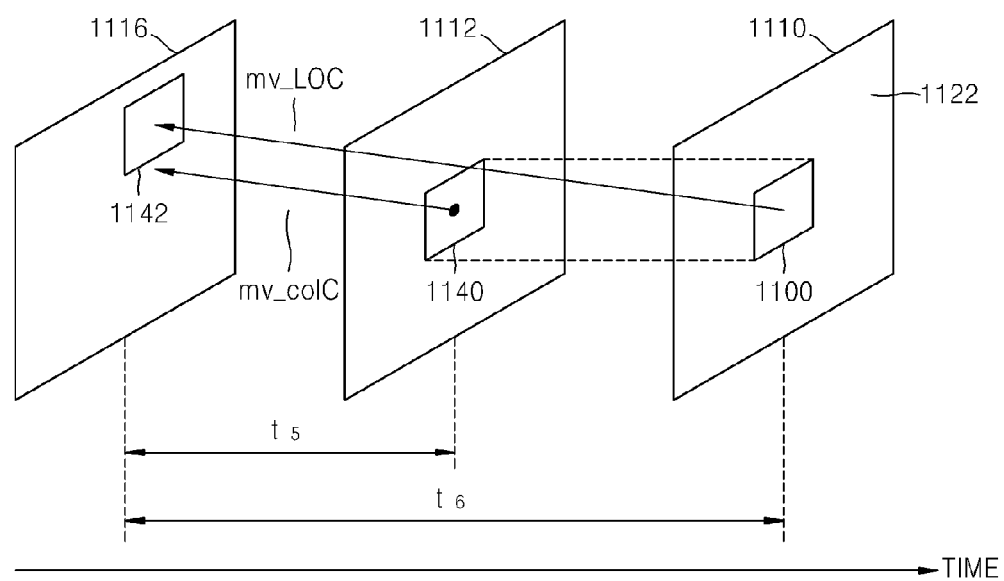

FIGS. 11A through 11C illustrate motion vector predictor candidates, according to another exemplary embodiment.

FIG. 11A illustrates a method of determining a motion vector predictor candidate of a bi-directional predictive picture (B picture). When a current picture including a current block is a B picture that performs bi-directional prediction, a motion vector generated based on a temporal distance may be a motion vector predictor candidate.

A motion vector predictor candidate mv_temporal of a current block 1100 of a current picture 1110 may be determined by using a motion vector of a block 1120 disposed at a collocated location with the current block 1100 of a picture 1112 that temporally precedes the current picture 1110. For example, when a motion vector mv_colA of the block 1120 disposed at the collocated location with the current block 1100 is generated with respect to a searched block 1122 of a picture 1114 that temporally follows the current picture 1110, mv_L0A and mv_L1A, which are motion vector predictor candidates of the current block 1100, may be determined as follows:

$$mv\_L1A = (t1/t2)*mv\_colA$$

$$mv\_L0A = mv\_L1A - mv\_colA$$

Here, mv_L0A denotes a motion vector predictor candidate of the current block 1110 with respect to the picture 1112 that temporally precedes the current picture 1110 and mv_L1A denotes a motion vector predictor candidate of the current block 1100 with respect to the picture 1114 that temporally follows the current picture 1110.

In FIG. 11A, the current picture 1110, which is a B picture, is interposed between the picture 1112 that temporally precedes the current picture 1110 and the picture 1114 that temporally follows the current picture 1110. Here, when the motion vector mv_colA of the block 1120 disposed at the collocated location with the current block 1100 is generated with respect to the picture 1114 that temporally follows the current picture 1110, the motion vector of the current block 1100 may be accurately predicted based on mv_L1A. In other words, the motion vector of the current block 1100 may be more accurately predicted when mv_colA is a motion vector in a direction illustrated in FIG. 11A, compared with when mv_colA is a motion vector that is in a direction opposite to a direction illustrated in FIG. 11A, that is, when mv_colA is generated with respect to another picture before the picture 1112 that temporally precedes the current picture 1110.

Accordingly, when a direction from the current block 1110 to the block 1120 disposed at the collocated location with the current block 1100 is List0, the motion vector mv_colA needs to be in a List1 direction and thus the current picture 1110 may be interposed between the picture 1112 and the picture 1114, as illustrated in FIG. 11A so that the motion vector of the current block 1100 may be accurately predicted based on mv_colA.

Also, the pictures 1110 through 1114 illustrated in FIG. 11A are illustrated according to a time order and thus the motion vector predictor candidate mv_temporal of the current block may be generated based on a picture order count (POC). A picture referred to by the current block may be a picture other than the adjacent pictures 1112 and 1114 illustrated in FIG. 11A and thus a motion vector predictor candidate of the current block is generated based on a POC.

For example, when a POC of the current picture is CurrPOC and a POC of a picture referred to by the current picture is CurrRefPOC, the motion vector predictor candidate of the current block may be generated as follows:

$$Scale = (CurrPOC - CurrRefPOC)/(ColPOC - ColRefPOC)$$

$$mv\_temporal = Scale*mv\_colA$$

Here, ColPOC is a POC of the picture 1112 that temporally precedes the current picture 1110 and includes the block 1120 and ColRefPOC is a POC of the picture 1114 that temporally follows the current picture 1110 and includes the block 1122 referred to by the block 1120.

FIG. 11B illustrates another method of generating a motion vector predictor candidate of a B picture. The method in FIG. 11B is different from the method in FIG. 11A in that the picture 1114 that temporally follows the current picture 1110 includes a block disposed at a collocated location with the current block 1100.

Referring to FIG. 11B, the motion vector predictor candidate of the current block 1100 of the current picture 1110 may be generated by using a motion vector of a block 1130 disposed at a collocated location with the current block 1100 of the picture 1114 that temporally follows the current picture 1110. For example, when a motion vector mv_colB of the block 1130 disposed at the collocated location with the current block 1100 is generated with respect to a searched block 1132 of the picture 1112 that temporally precedes the current picture 1110, mv_L0B and mv_L1B, which are motion vector predictor candidates of the current block 1100, may be determined as follows:

$$mv\_L0B = (t3/t4) * mv\_colB$$

$$mv\_L1B = mv\_L0B - mv\_colB$$

Here, mv_L0B denotes a motion vector predictor candidate of the current block 1110 with respect to the picture 1112 that temporally precedes the current picture 1110 and mv_L1B denotes a motion vector predictor candidate of the current block 1100 with respect to the picture 1114 that temporally follows the current picture 1110.

Similar to FIG. 11A, in FIG. 11B, the current picture 1110, which is a B picture, is interposed between the picture 1112 that temporally precedes the current picture 1110 and the picture 1114 that temporally follows the current picture 1110. Accordingly, when the motion vector mv_colB of the block 1130 disposed at the collocated location with the current block 1100 is generated with respect to the picture 1112 that temporally precedes the current picture 1110, the motion vector of the current block 1100 may be accurately predicted based on mv_L0B. In other words, the motion vector of the current block 1100 may be more accurately predicted when mv_colB is a motion vector in a direction illustrated in FIG. 11B, compared with when mv_colB is a motion vector that is in a direction opposite to a direction illustrated in FIG. 11B, that is, when mv_colB is generated with respect to another picture after the picture 1114 that temporally follows the current picture 1110.

Accordingly, when a direction from the current block 1110 to the block 1130 disposed at the collocated location with the current block 1100 is List1, the motion vector mv_colB of the block 1130 needs to be in a List0 direction and thus the current picture 1110 may be interposed between the picture 1112 and the picture 1114, as illustrated in FIG. 11B so that the motion vector of the current block 1100 may be accurately predicted based on mv_colB.

Also, a picture referred to by the current block may be a picture other than the adjacent pictures 1112 and 1114 illustrated in FIG. 11B and thus a motion vector predictor candidate of the current block is generated based on a POC.

For example, when a POC of the current picture is CurrPOC and a POC of a picture referred to by the current picture is CurrRefPOC, the motion vector predictor candidate of the current block may be generated as follows:

Scale=(CurrPOC−CurrRefPOC)/(ColPOC−ColRefPOC)

$$mv\_temporal = Scale * mv\_colB$$

Here, ColPOC is a POC of the picture 1114 that temporally follows the current picture 1110 and includes the block 1130 and ColRefPOC is a POC of the picture 1112 that temporally precedes the current picture 1110 and includes the block 1132 referred to by the block 1130.

FIG. 11C illustrates a motion vector predictor candidate of a predictive picture (P picture).

Referring to FIG. 11C, a motion vector predictor candidate of the current block 1100 of the current picture 1110 may be determined by using a motion vector of a block 1140 disposed at a collocated location with the current block 1100 of the picture 1112 that temporally precedes the current picture 1110. For example, when a motion vector mv_colC of the block 1140 disposed at the collocated location with the current block 1100 is generated with respect to a searched block 1142 of a picture 1116 that temporally precedes the current picture 1110, mv_L0C, which is a motion vector predictor candidates of the current block 1100, may be determined as follows:

$$mv\_L0C = (t6/t5) * mv\_colC$$

As described in relation to FIGS. 11A and 11B, mv_L0C may be determined based on a POC. mv_L0C may be determined based on a POC of the current picture 1110, a POC of a picture referred to by the current picture 1110, a POC of the picture 1112 that temporally precedes the current picture 1110, and a POC of the picture 1116 that temporally precedes the current picture 1110.

Since the current picture 1110 is a P picture, only one motion vector predictor candidate of the current block 1100 is determined, unlike FIGS. 11A and 11B.

Also, in order to use the motion vector predictor candidate generated based on a temporal distance in FIGS. 11A and 11B to predict a motion vector of the current block, information indicating which block from among the blocks 1120 and 1130 disposed at the collocated location with the current block 1100 is used to generate a motion vector predictor may be also encoded. Such information may be included in a slice header or a sequence header as a slice parameter or a sequence parameter.

Overall, group C of motion vector predictor candidates according to FIGS. 10A, 10B, and 11A through 11C may be as follows:

C={median(mv_a0, mv_b0, mv_c), mv_a0,
  mv_a1 . . . , mv_aN, mv_b0, mv_b1, . . . ,
  mv_bN, mv_c, mv_d, mv_e, mv_temporal}

Also, group C may be a group in which the number of motion vector predictor candidates is reduced:

C={median(mv_a', mv_b', mv_c'), mv_a', mv_b',
  mv_c', mv_temporal}

Here, mv_x denotes a motion vector of a block x, median( ) is denotes a middle value, and mv_temporal denotes motion vector predictor candidates generated by using a temporal distance described in relation to FIGS. 11A through 11C. mv_a' denotes a first effective motion vector from among mv_a0, mv_a1, . . . , and mv_aN. For example, when the block a0 is encoded using intra prediction and refers to the current block and other picture, the motion vector my_a0 of the block a0 is not effective and thus mv_a'=mv_a1. Also, when the motion vector of the block a1 is not effective, mv_a'=mv_a2. Similarly, mv_b' is a first effective motion vector from among mv_b0, mv_b1, . . . , and mv_bN and mv_c' is a first effective motion vector from among mv_c, mv_d, and mv_e.

A motion vector of a block that refers to a picture other than the current block from among motion vectors of blocks adjacent to the current block may not efficiently predict a motion vector of the current block. Accordingly, a motion vector of a block that refers to a picture other than the current block may be excluded from the group C of motion vector predictor candidates.

When the apparatus 900 for encoding a motion vector encodes a motion vector according to an explicit mode, the apparatus 900 also encodes information indicating which motion vector predictor candidate in group C is used to predict a motion vector of a current block. In other words, when the apparatus 900 for encoding a motion vector encodes a motion vector, the apparatus 900 allocates binary numbers to corresponding elements of group C, that is, the motion vector predictor candidates, and encodes the binary numbers corresponding to the motion vector predictor candidate used to predict a motion vector of a current block.

In order to specify one of elements in group C, binary numbers each corresponding to the motion vector predictor candidates are allocated and output. Thus, as the number of elements in group C decreases, elements in group C may be specified with binary numbers with lower bits.

Accordingly, if there are overlapped motion vector predictor candidates in group C, binary numbers may be allocated after the overlapped motion vector predictor candidates are excluded from group C. For example, when group C is C={median(mv_a', mv_b', mv_c'), mv_a', mv_b', mv_c', mv_temporal} as described above and mv_a', mv_b', and mv_c' are the same as each other, it may be determined that there are two elements in group C as C={mv_a', mv_temporal} and binary numbers may be allocated. When five elements in group C may be specified using 3 bits before the overlapped motion vector predictor candidates are excluded, two elements may be specified using 1 bit after the overlapped motion vector predictor candidates are excluded.

In order to increase probability that the overlapped motion vector predictor candidate is determined as a motion vector predictor of the current block, instead of excluding the overlapped motion vector predictor candidate, a predetermined weight may be added. As described above, since mv_a', mv_b', and mv_c' are the same as each other and only mv_a' is included in group C, a predetermined weight is added to mv_a' and thus probability that mv_a' is used to predict a motion vector of a current block may increase.

Also, when there is one motion vector predictor candidate, a binary number used to specify one of the motion vector predictor candidates may not be encoded. For example, when group C is C={median(mv_a0, mv_b0, mv_c), mv_a0, mv_a1 . . . , mv_aN, mv_b0, mv_b1, . . . , mv_bN, mv_c, mv_d, mv_e, mv_temporal}, and the blocks a0 through aN, the blocks b0 through bN, the block c, the block d, and the block e are all intra predicted, group C is C={mv_temporal} and thus substantially includes one element. Accordingly, in this case, the apparatus 900 for encoding a motion vector may not encode a binary number used to specify one of the motion vector predictor candidates.

It would have been obvious to one of ordinary skill in the art that motion vectors other than motion vector predictor candidates described above may be used as motion vector predictor candidates.

In addition, according to another exemplary embodiment, the candidate determiner 920 may reduce the number of motion vector predictor candidates based on estimation of an encoding result.

As described above, separate information is encoded and included in a bitstream in order to specify a motion vector predictor candidate used to predict a motion vector of a current block from among a plurality of motion vector predictor candidates. Accordingly, as the number of elements in group C decreases, information required to specify a motion vector predictor candidate used to predict a motion vector of a current block in group C may be encoded with low bit. In this regard, the candidate determiner 920 may selectively exclude predetermined motion vector predictor candidates from among all motion vector predictor candidates by using a predetermined evaluation function, which will be described in detail with reference to FIG. 12.

Figure 12:
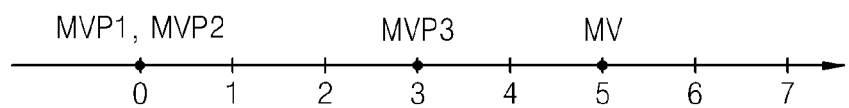
FIG. 12 illustrates a method of reducing motion vector predictor candidates, according to an exemplary embodiment.

FIG. 12 illustrates a method of reducing motion vector predictor candidates, according to an exemplary embodiment.

In FIG. 12, it is assumed that there are three elements MVP1, MVP2, and MVP3 in group C and a motion vector of a current block is MV. Since a motion vector predictor candidate that is most similar to a motion vector of a current block is used to predict the motion vector of the current block, MVP3 that is most similar to MV is used to predict the motion vector of the current block.

Accordingly, a vector difference (hereinafter, referred to as 'original motion vector difference') between the motion vector of the current block and a motion vector predictor candidate used to predict a motion vector of a current block is (2,0). Since MV is (5,0) and MVP3 is (3,0), the original motion vector difference is (2,0).

The candidate determiner 920 selectively excludes at least one motion vector predictor candidate from among all motion vector predictor candidates by using the original motion vector difference and a predetermined evaluation function. More specifically, the original motion vector difference and the predetermined motion vector predictor candidate are used to generate a virtual motion vector, and differences (hereinafter, referred to as 'virtual motion vector differences') between the generated virtual motion vector and all motion vector predictor candidates are generated with respect to all candidates. The original motion vector difference and the predetermined motion vector predictor candidate are added to each other to generate the virtual motion vector and the virtual motion vector differences between the generated virtual motion vector and the all motion vector predictor candidates are calculated. By comparing the original motion vector difference with the virtual motion vector differences calculated with respect to all candidates, the predetermined motion vector predictor candidate may be selectively excluded from all motion vector predictor candidates.

Referring to FIG. 12, the candidate determiner 920 determines whether MVP1, one of the motion vector predictor candidates, is excluded from the entire candidates.

When the virtual motion vector difference generated by subtracting a motion vector predictor candidate from a virtual motion vector based on MVP1 is smaller than the original motion vector difference, MVP1 may not be used to predict a motion vector of a current block. For example, when the virtual motion vector difference generated by subtracting MVP3 from a virtual motion vector generated by adding MVP1 and the original motion vector difference is smaller than the original motion vector difference, MVP3 predicts the virtual motion vector more accurately than MVP1 and in this case, MVP1 can not be the motion vector predictor.

In FIG. 12, when MVP1 and the original motion vector difference are added to each other, the virtual motion vector based on MVP1 is (2,0). Accordingly, when the virtual motion vector is generated based on MVP1, the virtual motion vector difference for MVP2 is (2,0) and the virtual motion vector difference for MVP3 is (−1,0). Here, since the virtual motion vector difference (−1,0) for MVP3 is smaller than the original motion vector difference (2,0), MVP1 may not be a motion vector predictor of a current block. Accordingly, MVP1 may be excluded from all motion vector predictor candidates. In other words, a motion vector predictor candidate that corresponds to MVP1 may be excluded from group C.

Here, the virtual motion vector difference calculated for MVP1 itself is (2,0) and is always the same as the original motion vector difference so that the virtual motion vector difference may not be smaller than the original motion vector difference. Accordingly, when the virtual motion vector differences are calculated for all motion vector predictor candidates, the virtual motion vector difference for MVP1 itself may not be calculated.

When a determination on whether MVP1 is excluded is completed, the candidate determiner 920 determines whether MVP2 is excluded from all motion vector predictor candidates. When MVP2 and the original motion vector difference are added to each other, a virtual motion vector based on MVP2 is (2,0). Accordingly, the virtual motion vector difference for MVP1 is (2,0) and the virtual motion vector difference for MVP3 is (−1,0). Since the virtual motion vector difference for MVP3 is smaller than the original motion vector difference, MVP2 may be excluded from all motion vector predictor candidates as in MVP1. When determining whether MVP2 is excluded, the virtual motion vector difference for MVP1 may be selectively compared with the original motion vector difference. Since it is determined that MVP1 should be excluded already, the virtual motion vector differences for the candidates other than MVP1 may be compared with the original motion vector difference.

Also, the candidate determiner 920 determines whether MVP3 is excluded. A virtual motion vector based on MVP3 is the same as an original motion vector of the current block. Although another motion vector predictor candidate (that is, MVP1 or MVP2) is subtracted from the original motion vector, a virtual motion vector difference that is smaller than the original motion vector difference may not be generated. Thus, MVP3 is not excluded from the motion vector predictor candidates. Also, according to another exemplary embodiment, since MVP3 determined to be used to predict a motion vector of a current block is not excluded from the motion vector predictor, the candidate determiner 920 may skip determination on whether MVP3, the motion vector predictor candidate used to predict a motion vector of the current block, is excluded.

Briefly, as the candidate determiner 920 determines whether a second motion vector predictor candidate, one of the motion vector predictor candidates, is excluded, the second motion vector predictor candidate and the original motion vector difference are added to each other so as to generate a virtual motion vector and differences between the virtual motion vector and other motion vector predictor candidates are calculated for all candidates so as to generate a plurality of virtual motion vector differences. When at least one virtual motion vector difference that is smaller than the original motion vector difference exists from among the plurality of virtual motion vector differences, the second motion vector predictor candidate is not a motion vector predictor of a current block and is excluded from the motion vector predictor candidates.

Also, the candidate determiner 920 repeatedly performs determinations on exclusion for the motion vector predictor candidates so that the number of the motion vector predictor candidates, that is, elements of group C, may be reduced. According to an arrangement order of motion vector predictor candidates of group C, whether to exclude is determined in order. For example, when C={median(mv_a', mv_b', mv_c'), mv_a', mv_b', mv_c', mv_temporal}, whether to exclude median(mv_a', mv_b', mv_') is determined and when determination is completed, whether to exclude mv_a' is determined. Then, whether to exclude mv_b' is determined. According to an arrangement order of group C, determination on exclusion is repeated until mv_temporal.

When determination is repeatedly performed, comparison between the virtual motion vector difference and the original motion vector difference for candidates already excluded in the determination may be omitted as described in relation to exclusion of MVP2.

Also, group C may be rearranged according to a predetermined criterion as will be described later with reference to FIGS. 13A through 13D. When group C is rearranged, determination on exclusion is repeated according to a rearranged order.

Comparison between the virtual motion vector difference and the original motion vector difference described in relation to FIG. 12 may be applied to not only a one-dimensional motion vector but also a two-dimensional motion vector. In other words, a magnitude of the virtual motion vector difference defined by x-coordinates and y-coordinates is compared with a magnitude of the original motion vector difference and thus a predetermined motion vector predictor may be selectively excluded from the entire candidates.

However, a magnitude used to compare the virtual motion vector difference with the original motion vector difference is only an example and various criteria may be used to compare the virtual motion vector difference with the original motion vector difference. When an evaluation function that generates a value for the virtual motion vector difference and a value for the original motion vector difference based on a predetermined criterion is 'A', the virtual motion vector difference may be compared with the original motion vector difference according to Equation 1 below:

$$A(mvx+\text{MVD}-mvy) < A(\text{MVD}) \quad \text{(Equation 1)}$$

The candidate determiner 920 determines whether at least one 'mvy' exists in all the candidates in order to determine whether 'mvx', one of the motion vector predictor candidates, is excluded from the motion vector predictor candidates. In Equation 1, 'MVD' denotes an original motion vector difference. In order to determine whether to exclude 'mvx', 'A(mvx+MVD−mvy)', which is a value obtained by evaluating 'mvx+MVD−mvy' that is a virtual motion vector difference between 'mvx+MVD', a virtual motion vector based on 'mvx', and 'mvy', the other motion vector predictor candidate, by using a predetermined evaluation function 'A' is calculated, and values generated as a result of calculation are compared with 'A(MVD)', a value for the original motion vector difference. The motion vector predictor candidates other than 'mvx' from among all candidates are repeatedly substituted for 'mvy' and whether at least one 'mvy' that satisfies Equation 1 exists in the entire candidates is determined.

As described above, the virtual motion vector difference and the original motion vector difference evaluated by 'A' may be defined by x-coordinates and y-coordinates. In this case, an evaluation function may be defined by the sum of an x-coordinates evaluated value and a y-coordinates evaluated value as in Equation 2 below:

$$A(p,q)=f(p)+f(q) \qquad \text{(Equation 2)}$$

When the virtual motion vector difference or the original motion vector difference is defined by x-coordinates 'p' and y-coordinates 'q', each coordinate value is input to a predetermined function 'f' and the evaluation function 'A' is defined by the sum obtained by the substitution.

According to an exemplary embodiment, the evaluation function 'A' in Equation 1 and Equation 2 may be an evaluation function that estimates a result obtained by entropy encoding the virtual motion vector difference and a result obtained by entropy encoding the original motion vector difference. The candidate determiner 920 estimates the result obtained by entropy encoding the virtual motion vector difference and the original motion vector difference based on the evaluation function 'A' and the number of the motion vector predictor candidates may be reduced based on the result of estimation. This is described in detail with reference to Equation 3 below:

Length=1;
Temp=(val<=0)?(-val<<1)+1: (val<<1);
while (1!=Temp) {
Temp>>=1;
Length+=2;
}

$$f(val)=\text{Length} \qquad \text{(Equation 3)}$$

A function 'f' that estimates a result obtained by entropy encoding with respect to an x-coordinate value or a y-coordinate values may be defined as in Equation 3. When 'val', an x-coordinate value or a y-coordinate, is input to the function 'f' that estimates variable length coding (for example, universal variable length coding) result, 'Length is calculated according to Equation 3.

Equation 3 may be represented as follows:

$$f(\text{val}) = \begin{cases} 1, |\text{val}| = 0 \\ 2 * \lfloor \log_2 |\text{val}| \rfloor + 3, |\text{val}| > 0 \end{cases}$$

The x-coordinate value or the y-coordinate may be an x-coordinate value or a y-coordinate of the virtual motion vector difference or the original motion vector difference.

According to Equation 3, when 'val' is a negative number or '0', 'val' is changed to a positive number and then is multiplied by '2' by shifting to the left by 1 bit. And '1' is added, thereby storing the result in 'Temp'. When 'val' is a positive number, 'val' is multiplied by '2' by shifting to the left by 1 bit, thereby storing the result in 'Temp'. Then, 'while' loops are repeated until 'Temp' is 1, and 'Length' is calculated.

For example, when the virtual motion vector difference or the original motion vector difference is (2,0), A(2,0)=f(2)+f(0).

f(2) is calculated as follows. '2' of f(2) is a positive number and thus is shifted to the left by 1 bit so that 'Temp' is set to '4'. In a first 'while' loop, 'Temp' is '4', which is not '1', and thus '4' is multiplied by '½' by shifting to the right so that 'Temp' is set to '2'. Since an initial value of 'Length' is set to '1', 'Length' in the first 'while' loop is '3'.

In a second 'while' loop, 'Temp' is '2', which is not '1', and thus '2' is multiplied by '½' by shifting to the right so that 'Temp' is set to '1'. Since a current 'Length' is 3, 'Length' is '5' in the second 'while' loop. A third 'while' loop is not performed since 'Temp' is '1', and f(2) is '5'.

f(0) is calculated as follows. Since an input coordinate value of f(0) is '0', '0' is shifted to the left by 1 bit and '1' is added so that 'Temp' is set to '1'. Accordingly, 'while' loops are not performed. f(0) is '1' according to an initial value of 'Length'.

The predetermined evaluation value 'f' described in relation to Equation 3 is a function for estimating a result of entropy encoding using a variable length coding. Accordingly, the candidate determiner 920 estimates a result obtained by variable length coding the virtual motion vector differences by using the evaluation function 'A', in order to determine whether 'mvx' is excluded from the motion vector predictor candidates. As a result of estimation, when at least one virtual motion vector difference estimated to be encoded by a shorter length than the original motion vector difference exists, 'mvx' is excluded from all motion vector predictor candidates.

However, it would have been obvious to one of ordinary skill in the art that an entropy encoding result is estimated by using methods other than the variable length coding result. For example, another evaluation function 'h' may be used to estimate and compare an entropy encoding result of the virtual motion vector difference and an entropy encoding result of the original motion vector difference. Here, 'h' may be a function that estimates a result of context adaptive binary arithmetic coding.

Also, according to another exemplary embodiment, in order to increase accuracy of an evaluation result based on a predetermined evaluation function, a result obtained by evaluating index information may be also estimated. The index information is used to specify a predetermined motion vector predictor candidate from among all motion vector predictor candidates. This is described in detail with reference to Equation 4:

$$A(mvx+MVD-mvy, mvyIdx)<A(MVD, mvxIdx) \qquad \text{(Equation 4)}$$

The candidate determiner 920 determines whether at least one 'mvy' that satisfies Equation 4 exists in the entire candidates in order to determine whether 'mvx', one of the motion vector predictor candidates, is excluded from the motion vector predictor candidates. In Equation 4, 'MVD' denotes an original motion vector difference, and mvxIdx and mvyIdx denote index information used to specify 'mvx' and 'mvy', respectively from all motion vector predictor candidates. In order to determine whether to exclude 'mvx', 'mvx+MVD-mvy', which is a virtual motion vector difference between 'mvx+MVD', a virtual motion vector based on 'mvx', and 'mvy', the other motion vector predictor candidate, and index information for specifying 'navy' from among the all candidates is evaluated by using a predetermined evaluation function 'A'. Also, the original motion vector difference and index information for specifying 'mvx' from among the entire candidates is evaluated by using a predetermined evaluation function 'A'. As a result of the evaluation, whether at least one 'mvy' exists in the entire candidates is determined.

As described above, the virtual motion vector difference and the original motion vector difference evaluated by 'A' may be defined by x-coordinates and y-coordinates and may be defined as in Equation 5 below:

$$A(mvx+MVD-mvy, mvyIdx)=f(p1)+f(q1)+g(mvyIdx)$$

$$A(MVD, mvxIdx)=f(p2)+f(q2)+g(mvxIdx) \qquad \text{(Equation 5)}$$

In comparison with Equation 2, A(mvx+MVD-mvy) in the left side of Equation 2 only evaluates the virtual motion vector difference, whereas A(mvx+MVD-mvy, mvyIdx) of Equation 5 evaluates the virtual motion vector difference and information for specifying 'mvy' from all motion vector predictor candidates. The evaluation function 'A' may be a function for evaluating an entropy encoding result. Here, the function 'f' may be a function for estimating an entropy encoding result based on an x-coordinates value or a y-coordinates value of the virtual motion vector difference as described in relation to Equation 2 and the function 'g' may be a function for estimating an entropy encoding result of 'mvxIdx'. When an x-coordinates value and a y-coordinates value of 'mvx+MVD−mvy' are 'p1' and 'q1', respectively, A(mvx+MVD−mvy, mvxIdx) may be calculated as in Equation 5.

A(MVD) in the right side of Equation 2 only evaluates the original motion vector difference, whereas A(MVD, mvxIdx) of Equation 5 evaluates the original motion vector difference and information for specifying 'mvx' from all motion vector predictor candidates. The function 'f' may be a function for estimating an entropy encoding result based on an x-coordinates value or a y-coordinates value of the original motion vector difference as described in relation to Equation 2 and the function 'g' may be a function for estimating an entropy encoding result of 'mvxIdx'. When an x-coordinates value and a y-coordinates value of 'MVD' are 'p2' and 'q2', respectively, A(MVD, mvxIdx) may be calculated as in Equation 5.

Determination on exclusion according to Equations 4 and 5 may be supplementarily used in determination on exclusion according to Equation 2. In other words, whether 'mvx' is excluded from all motion vector predictor candidates is firstly determined based on Equation 2, and exclusion may be again determined according to Equations 4 and 5. For example, as a result of determination according to Equation 2, when 'A(mvx+MVD−mvy)' is same with or greater than 'A(MVD)', and 'A(mvx+MVD−mvy)' is not smaller than 'A(MVD)', 'mvx' is not excluded from all motion vector predictor candidates according to Equation 2. However, although 'A(mvx+MVD−mvy)' and 'A(MVD)' are the same each other, 'mvx' may be excluded from all motion vector predictor candidates based on the result of determination according to Equations 4 and 5.

When the candidate determiner 920 determines on exclusion for the motion vector predictor candidates based on Equations 1 through 5, determination on exclusion for the motion vector predictor candidates is repeatedly performed according to an arrangement order of group C. According to another exemplary embodiment, the candidate determiner 920 rearranges group C according to a predetermined criterion and determination on exclusion may be repeated according to a rearranged order. This is described in detail with reference to FIGS. 13A through 13D.

FIGS. 13A through 13D illustrate a location of a current block included in a coding unit having a predetermined size, according to an exemplary embodiment.

When all motion vector predictor candidates are C={median(mv_a', mv_b', mv_c'), mv_a', mv_b', mv_c', mv_temporal}, binary numbers are each allocated to the motion vector predictor candidates of group C and thus a motion vector predictor candidate used to predict a motion vector of a current block may be specified from among the motion vector predictor candidates, as described above.

Here, the binary numbers are allocated according to an arrangement order of the motion vector predictor candidates included in group C and may be a variable length code based on a Huffman code. Accordingly, a small number of bits may be allocated to the motion vector predictor candidates disposed at the front in an arrangement order of group C. For example, '0' bit may be allocated to 'median(mv_a', mv_b', mv_c')', '00' bit may be allocated to mv_a', and '01' bit may be allocated to mv_b'. Accordingly, the candidate determiner 920 arranges the motion vector predictor candidates according to a predetermined order so that a motion vector predictor with high possibility to be used in predicting a motion vector of a current block from among the motion vector predictor candidates is located at the front in group C.

The motion vector predictor with high possibility to be used in predicting a motion vector of a current block may be determined according to a location of the current block in a coding unit. The location of the current block may be expressed by using a partition index of the current block. Partition indexes are allocated to blocks in the coding unit according to a predetermined order. Thus, the motion vector predictor with high possibility to be used in predicting the motion vector of the current block may be determined according to the partition index of the current block. As in FIG. 13A, when a current block is located at a lower side of the coding unit, a motion vector of the current block may be the same as or similar to a motion vector of a block adjacent to a left side of the coding unit or a motion vector of a block adjacent to a lower left side of the coding unit. Accordingly, an arrangement order may need to be changed so that the motion vector predictor candidate that corresponds to the motion vector of the block adjacent to the left side or the motion vector of the block adjacent to the lower left side is located at the front in group C. Since mv_b' from among the motion vector predictor candidates in group C is a motion vector predictor candidate that corresponds to the motion vector of the block adjacent to the left side, order of mv_b' and median(mv_a', mv_b', mv_c') is changed in group C and thus group C may be rearranged as in C={mv_b', mv_a', median(mv_a', mv_b', mv_c'), mv_c', mv_temporal}.

Figure 13A:
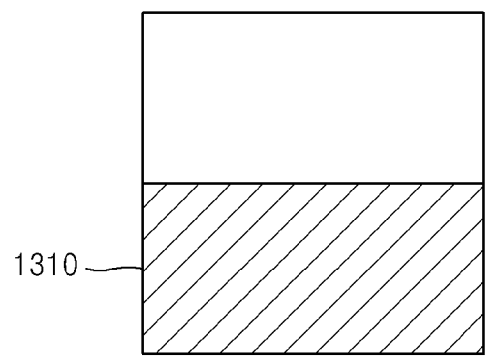
FIGS. 13A through 13D illustrate a location of a current block included in a coding unit having a predetermined size, according to an exemplary embodiment.
Figure 13B:
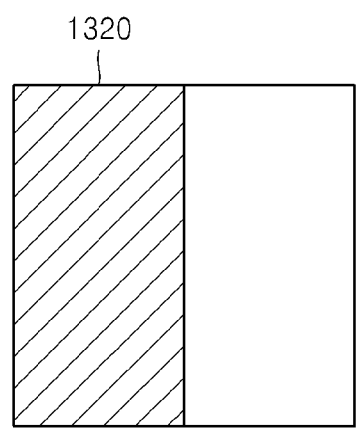

Similarly, when a current block is located at a left side of the coding unit as in FIG. 13B, a motion vector predictor candidate that corresponds to a motion vector of a block adjacent to a left side of the coding unit and a motion vector of a block adjacent to an upper side of the coding unit may be used to predict a motion vector of the current block. Since mv_b' from among the motion vector predictor candidates in group C is a motion vector predictor candidate that corresponds to the motion vector of the block adjacent to the left side, order of mv_b' and median(mv_a', mv_b', mv_c') is changed in group C and thus group C may be rearranged as in C={mv_b', mv_a', median(mv_a', mv_b', mv_c'), mv_c', mv_temporal}.

Figure 13C:
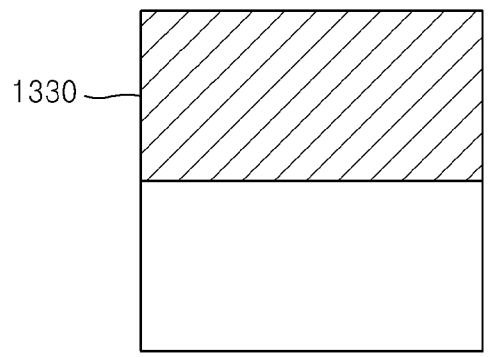

As in FIG. 13C, when a current block is located at an upper side of the coding unit, a motion vector predictor candidate that corresponds to a motion vector of a block adjacent to a left side of the coding unit and a motion vector of a block adjacent to the upper side of the coding unit may be used as a motion vector predictor of the current block. Since mv_a' from among the motion vector predictor candidates in group C is a motion vector predictor candidate that corresponds to the motion vector of the block adjacent to the upper side, order of mv_a' and median(mv_a', mv_b', mv_c') is changed in group C and thus group C may be rearranged as in C={mv_a', median(mv_a', mv_b', mv_c'), mv_b', mv_c', mv_temporal}.

Figure 13D:
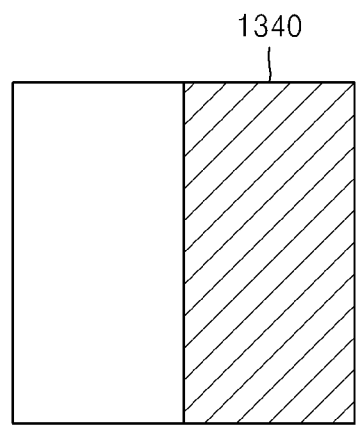

As in FIG. 13D, when a current block is located at a right side of the coding unit, a motion vector predictor candidate that corresponds to a motion vector of a block adjacent to an upper side of the coding unit may be used to predict a motion vector of the current block. Since mv_c' from among the motion vector predictor candidates in group C is a motion vector predictor candidate that corresponds to a motion vector of a block adjacent to an upper right side, order of mv_c' and median(mv_a', mv_b', mv_c') is changed in group C and thus group C may be rearranged as in C={mv_c', mv_a', mv_b', median(mv_a', mv_b', mv_c'), mv_temporal}.

A location of a current block in a coding unit as a criterion used to rearrange the motion vector predictor candidates is an example. In other words, various criteria may be used to rearrange the motion vector predictor candidates. Various criteria used to arrange a motion vector predictor candidate with high possibility that it is similar to the motion vector of the current block at the front in group C may be used as criteria for rearranging the motion vector predictor candidates. The motion vector predictor candidate with high possibility that it is similar to the motion vector of the current block is determined based on predetermined information related to other blocks encoded before the current block and group C may be rearranged according to the determination.

Also, the motion vector predictor candidate with high possibility that it is similar to the motion vector of the current block is determined based on other information encoded or decoded with respect to the current block before the motion vector of the current block is encoded, and group C may be rearranged according to the determination.

In addition, group C may be rearranged by excluding overlapped motion vector predictor candidates. When there are overlapped motion vector predictor candidates in all motion vector predictor candidates, the overlapped motion vector predictor candidates are firstly excluded and whether to exclude the motion vector predictor candidates may be determined according to Equations 1 through 5.

Referring back to FIG. 9, the motion vector encoder 930 encodes information about a motion vector and information about a motion vector predictor. The information about a motion vector is an original motion vector difference between an original motion vector of a current block and a original motion vector predictor. The information about a motion vector predictor is information for specifying a motion vector predictor candidate used to predict a motion vector of a current block in the motion vector predictor candidates from which at least one motion vector predictor is excluded. In other words, information for specifying a motion vector predictor of a current block in the motion vector predictor candidates that are not excluded in the candidate determiner 920 is encoded as information about a motion vector predictor.

The original motion vector difference is received from the motion vector estimator 910 and is encoded according to a predetermined entropy encoding method. Also, information for specifying a motion vector predictor candidate used to predict a motion vector of a current block from among the motion vector predictor candidates determined by selectively excluding at least one motion vector predictor candidate in the candidate determiner 920 is encoded.

When the candidate determiner 920 determines the motion vector predictor candidates by excluding at least one motion vector predictor candidate from among all motion vector predictor candidates according to Equations 1 through 5, information for specifying the motion vector predictor candidate used to predict a motion vector of a current block from among the determined motion vector predictor candidates is encoded. The motion vector encoder 930 may index each of the motion vector predictor candidates that are not excluded in the candidate determiner 920 and entropy encodes index information as information about a motion vector predictor. Indexing denotes allocating predetermined binary numbers to each of the motion vector predictor candidates and the information about a motion vector predictor denotes binary number allocated to a motion vector predictor candidate used to predict a motion vector of the current block. When one motion vector predictor candidate remains after the candidate determiner 920 selectively excludes at least one motion vector predictor candidate, information about a motion vector predictor may not be separately encoded in the motion vector encoder 930, as the motion vector predictor candidate to be used to predict a motion vector of a current block is implicitly determined.

Also, as described in relation to FIGS. 13A through 13D, the candidate determiner 920 may index each of the motion vector predictor candidates generated by rearranging all motion vector predictor candidates according to a predetermined criterion and by selectively excluding at least one motion vector predictor from among all the rearranged motion vector predictor candidates and may entropy encodes index information.

As a result of rearrangement performed by the candidate determiner 920, binary numbers with the smallest bit number may be allocated to the motion vector predictor candidate with high possibility to be used to predict a motion vector of a current block and thus information about a motion vector predictor may be encoded with high compression ratio.

Figure 14:
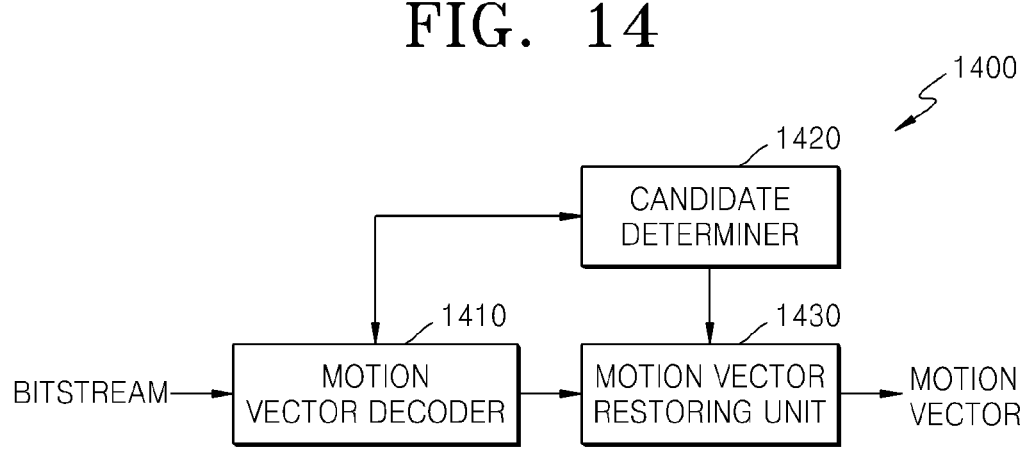
FIG. 14 is a block diagram of an apparatus for decoding a motion vector, according to an exemplary embodiment.

FIG. 14 is a block diagram of an apparatus 1400 for decoding a motion vector, according to an exemplary embodiment.

The apparatus 1400 for decoding a motion vector of FIG. 14 is included in the apparatus 200 for decoding an image of FIG. 2 or the image decoder 500 of FIG. 5. Referring to FIG. 14, the apparatus 1400 for decoding a motion vector includes a motion vector decoder 1410, a candidate determiner 1420, and a motion vector restoring unit 1430.

The apparatus 1400 for decoding a motion vector decodes a motion vector of a current block when the motion vector of the current block is encoded according to the explicit mode from among the explicit mode and the implicit mode described above.

The motion vector decoder 1410 receives a bitstream for the motion vector of the current block and decodes the received bitstream. Information about the motion vector included in a bitstream is decoded. An original motion vector difference of the current block is decoded. The original motion vector difference may be decoded according to a predetermined entropy decoding method. The original motion vector difference is a vector difference between the motion vector of the current block and a motion vector predictor candidate used to predict the motion vector of the current block. In a method of decoding a motion vector according to an exemplary embodiment, at least one motion vector predictor candidate is excluded from among all motion vector predictor candidates according to Equations 1 through 5 and the motion vector predictor candidates are determined. The motion vector predictor candidates are not fixed and are decoded in a block unit so that the motion vector predictor candidates may be continuously changed. Accordingly, although information about the motion vector predictor candidates is the same, if the motion vector predictor candidates are not determined, the motion vector predictor candidate used to predict a motion vector of a current block may not be accurately restored.

Thus, the candidate determiner 1420 determines the motion vector predictor candidates before the motion vector predictor candidate used to predict a motion vector of a current block is determined. At least one motion vector predictor candidate from among all motion vector candidates is selectively excluded according to Equations 1 through 5 and the motion vector predictor candidates are determined. A motion vector predictor candidate that is not used to predict a motion vector of a current block from among all candidates determined based on motion vectors of blocks included in a previously encoded area adjacent to the current block is excluded based on a predetermined evaluation function.

A virtual motion vector is generated based on a predetermined motion vector and from among all motion vector predictor candidates and information about a motion vector predictor decoded in a motion vector decoder, and virtual motion vector differences, which are differences between the generated virtual motion vector and other motion vector predictor candidate, are calculated for all candidates. The calculated virtual motion vector differences are compared with information about a motion vector decoded in the motion vector decoder 1410, that is an information about the original motion vector difference, and the predetermined motion vector predictor candidate is selectively excluded. A result obtained by entropy encoding the virtual motion vector differences is compared with a result obtained by entropy encoding the original motion vector difference so that whether to exclude a predetermined motion vector predictor candidate may be determined. Also, in order to increase estimation accuracy of an entropy encoding result, a result obtained by entropy encoding index information is also estimated and is used in determination on exclusion. The method of excluding the motion vector predictor candidates is described in relation to Equations 1 through 5.

Also, according to another exemplary embodiment, the candidate determiner 1420 rearranges all motion vector predictor candidates according to a predetermined criterion, repeatedly performs determination on exclusion for all rearranged motion vector predictor candidates according to Equations 1 through 5, and may selectively exclude at least one motion vector predictor candidate. Overlapped motion vector predictor candidates may be excluded from all rearranged motion vector predictor candidates and determination on exclusion may be repeatedly performed according to Equations 1 through 5.

When a plurality of motion vector predictor candidates remain from among all motion vector predictor candidates after the candidate determiner 1420 excludes at least one motion vector predictor candidate from among all motion vector predictor candidates, the motion vector decoder 1410 decodes information about a motion vector predictor. The information about a motion vector predictor is decoded according to a predetermined entropy decoding method. The information about a motion vector predictor is information for specifying a motion vector predictor candidate used to predict a motion vector of a current block from among the motion vector predictor candidates from which at least one motion vector predictor candidate is excluded. Information for specifying a motion vector predictor candidate used to predict a motion vector of a current block from among the motion vector predictor candidates that are not excluded in the candidate determiner 1420 is decoded.

When one motion vector predictor candidate remains after the candidate determiner 1420 excludes at least one motion vector predictor candidate from among all motion vector predictor candidates, the remained motion vector predictor candidate is used to predict a motion vector of a current block and thus the motion vector decoder 1410 may not separately decode information about the motion vector predictor candidate.

The motion vector restoring unit 1430 restores a motion vector of a current block based on information about a motion vector decoded in the motion vector decoder 1410. The original motion vector difference decoded in the motion vector decoder 1410 and the motion vector predictor candidate used to predict a motion vector of a current block are added to each other so as to restore a motion vector of a current block. A motion vector predictor candidate to be used in predicting a motion vector of a current block is determined from among the motion vector predictor candidates determined in the candidate determiner 1420 and the determined motion vector predictor candidate is added to the original motion vector difference. When a plurality of motion vector predictor candidates remain instead of one motion vector predictor candidate, as a result of exclusion in the candidate determiner 1420, the motion vector predictor candidates used to predict a motion vector of a current block may be determined based on information about a motion vector predictor decoded in the motion vector decoder 1410.

Since the motion vector predictor candidates are determined by the candidate determiner 1420, even if decoded information about a motion vector predictor is the same, the motion vector predictor candidates used to predict a motion vector of a current block may be motion vectors of adjacent blocks in different locations.

Figure 15:
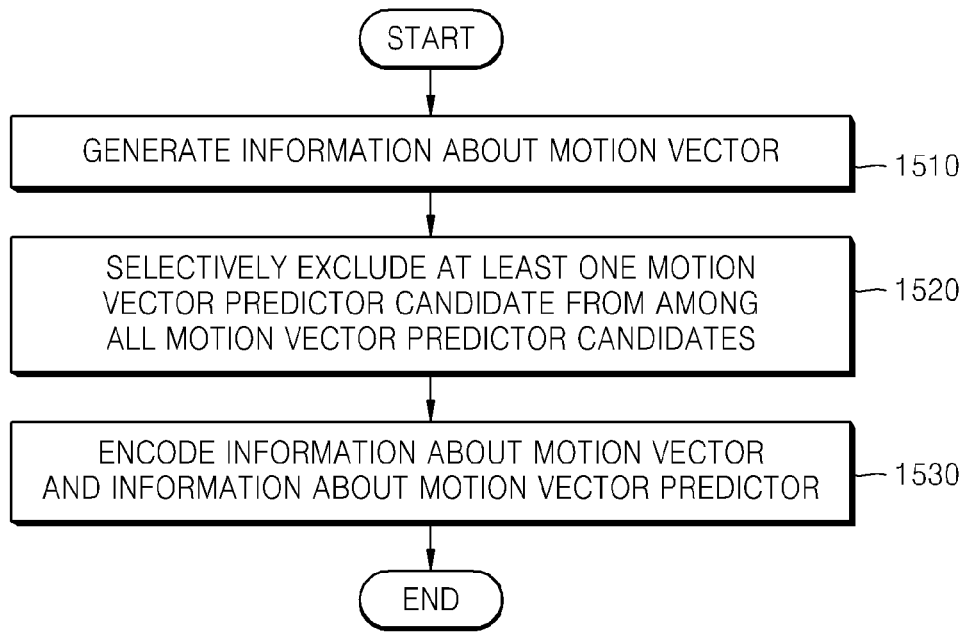
FIG. 15 is a flowchart illustrating a method of encoding a motion vector, according to an exemplary embodiment.

FIG. 15 is a flowchart illustrating a method of encoding a motion vector, according to an exemplary embodiment.

Referring to FIG. 15, in operation 1510, an apparatus for encoding a motion vector estimates a motion vector of a current block and determines a motion vector predictor candidate used to predict the motion vector of the current block from among all motion vector predictor candidates. A block that is the same as or similar to the current block is searched in a plurality of reference pictures and as a result of searching, a motion vector is estimated, that is a relative location difference between the current block and a reference block.

Then, the motion vector of the current block is predicted based on motion vectors of blocks included a previously encoded area adjacent to the current block. In other words, the motion vectors of the blocks included in the previously encoded area adjacent to the current block are set to be motion vector predictor candidates, and a motion vector predictor candidate that is most similar to a motion vector of an estimated current block from among the motion vector predictor candidates is determined. A vector difference between the motion vector of the current block and the determined motion vector predictor candidate, that is an original motion vector difference, is generated.

In operation 1520, the apparatus for encoding an image selectively excludes at least one motion vector predictor candidate from among all motion vector predictor candidates. A motion vector predictor candidate that is not used to predict the motion vector of the current block is excluded from among all motion vector predictor candidates.

The apparatus for encoding an image generates a virtual motion vector by using a predetermined motion vector predictor candidate from among all motion vector predictor candidates and the original motion vector difference generated in operation 1510. The generated virtual motion vector and other motion vector predictor candidate are used to generate a virtual motion vector difference. The virtual motion vector differences for each of all motion vector predictor candidates are generated, and the generated virtual motion vector differences are compared with the original motion vector difference so that the predetermined motion vector predictor candidate may be selectively excluded.

A process of generating the virtual motion vector and selectively excluding the motion vector predictor candidate in operation 1520 is repeatedly performed for all candidates and thus at least one motion vector predictor candidate may be excluded from all candidates. When an excluding process is repeatedly performed, the virtual motion vector differences for motion vector predictor candidates other than motion vector predictors that are already excluded are calculated and the calculated virtual motion vector differences may be compared with the original motion vector difference.

The virtual motion vector difference and the original motion vector difference may be evaluated and compared with each other based on a predetermined evaluation function, wherein the predetermined evaluation function may be a function that estimates an entropy encoding result. The virtual motion vector difference and the original motion vector difference may be compared with each other based on a function that estimates a result obtained by entropy encoding the virtual motion vector difference and a result obtained by entropy encoding the original motion vector difference. Also, in order to increase evaluation accuracy, a result obtained by encoding index information may also be estimated and used in determination on exclusion. The method of excluding at least one motion vector predictor candidate from among all motion vector predictor candidates is described in relation to Equations 1 through 5.

Also, as described in relation to FIGS. 13A through 13D, the apparatus for encoding a motion vector may rearrange all motion vector predictor candidates according to a predetermined criterion and selectively exclude at least one motion vector predictor candidate from among all rearranged motion vector predictor candidates. In addition, the apparatus for encoding a motion vector may exclude overlapped motion vector predictor candidates from among all rearranged motion vector predictor candidates and repeatedly perform determination on exclusion according to Equations 1 through 5.

In operation 1530, the apparatus for encoding a motion vector encodes information about a motion vector and information about a motion vector predictor. Information about the original motion vector difference and information for specifying a motion vector predictor candidate used to predict the motion vector of the current block are encoded. The information about a motion vector predictor may be information for specifying a motion vector predictor candidate used to predict a motion vector of a current block from among the motion vector predictor candidates that are not excluded in operations 1520 and 1530.

When one motion vector predictor candidate remains after at least one motion vector predictor candidate is excluded from among all motion vector predictor candidates, the information about a motion vector predictor may not be encoded.

Figure 16:
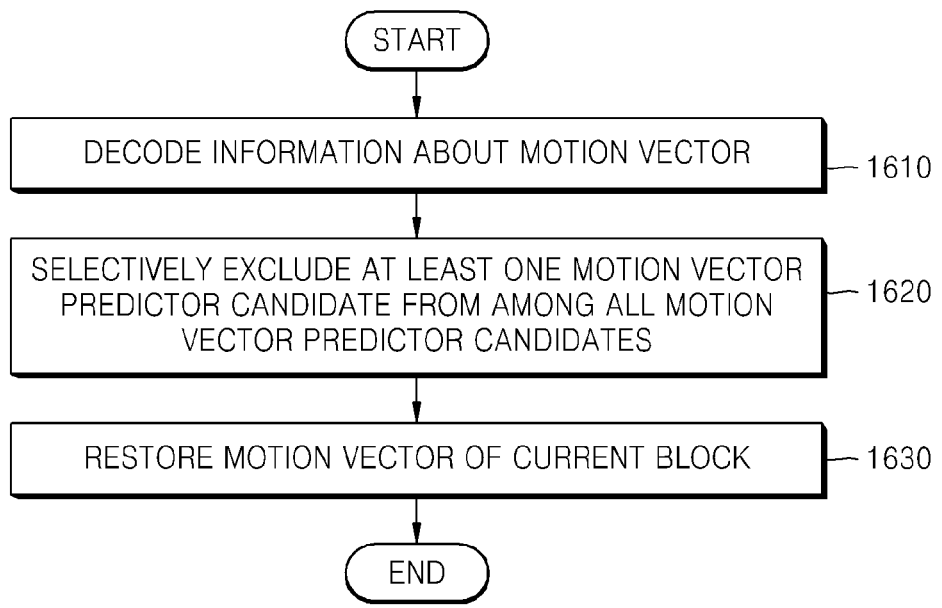
FIG. 16 is a flowchart illustrating a method of decoding a motion vector, according to an exemplary embodiment.

FIG. 16 is a flowchart illustrating a method of decoding a motion vector, according to an exemplary embodiment.

Referring to FIG. 16, an apparatus for decoding a motion vector decodes information about a motion vector of a current block from a received bitstream, in operation 1610. The information about a motion vector may be an original motion vector difference between a motion vector of a current block and a motion vector predictor of a current block.

In operation 1620, the apparatus for decoding a motion vector generates a virtual motion vector based on the information about a motion vector decoded in operation 1610 and one motion vector predictor candidate from among motion vector predictor candidates.

When the virtual motion vector is generated, the apparatus for decoding a motion vector excludes at least one motion vector predictor candidate from among all motion vector predictor candidates. All motion vector predictor candidates are determined based on motion vectors of blocks included a previously decoded area adjacent to the current block. The apparatus for decoding a motion vector may selectively exclude at least one motion vector predictor candidate from among all motion vector predictor candidates. A virtual motion vector difference and the original motion vector difference decoded in operation 1610 are evaluated based on a predetermined evaluation function so as to selectively exclude a predetermined motion vector predictor candidate. The method of excluding the motion vector predictor candidate from among all candidates is the same as operation 1530 and is described above with reference to Equations 1 through 5.

A process of generating the virtual motion vector and selectively excluding the motion vector predictor candidate in operation 1620 is repeatedly performed for all candidates and thus at least one motion vector predictor candidate may be excluded from all candidates.

Also, as described in relation to FIGS. 13A through 13D, the apparatus for decoding a motion vector may rearrange all motion vector predictor candidates according to a predetermined criterion and selectively exclude at least one motion vector predictor candidate from among all rearranged motion vector predictor candidates. In addition, the apparatus for decoding a motion vector may exclude overlapped motion vector predictor candidates from among all rearranged motion vector predictor candidates and repeatedly perform determination on exclusion according to Equations 1 through 5.

When a plurality of motion vector predictor candidates remain as a result of exclusion, the information about a motion vector predictor is decoded and when one motion vector predictor candidate remains, the information about a motion vector predictor is not decoded.

In operation 1630, the apparatus for decoding a motion vector determines a motion vector predictor used to predict a motion vector of a current block from among the motion vector predictor candidates that are not excluded in operation 1620.

The motion vector predictor candidate used to predict a motion vector of a current block from among the motion vector predictor candidates may be determined based on information about a motion vector predictor of a current block. When one motion vector predictor candidate remains as a result of exclusion in operation 1620, one remaining motion vector predictor candidate is determined as a motion vector predictor used to predict a motion vector of a current block.

When the motion vector predictor candidate is determined, a motion vector of a current block is restored by adding the determined motion vector predictor candidate and the original motion vector difference decoded in operation 1610.

According to an exemplary embodiment, when the motion vector predictor candidates are used to predictive encoding and decoding a motion vector, the number of the motion vector predictor candidates may be reduced to predictive encode and decode a motion vector. Accordingly, information required to specify the motion vector predictor used to predict a motion vector of a current block from among the motion vector predictor candidates may be encoded with a minimum bit so that compression ratio of encoding/decoding a motion vector is increased and thereby, compression ratio of encoding/decoding an image may be improved.

While exemplary embodiments have been particularly shown and described above, it will be understood by those of ordinary skill in the art that various changes in form and details may be made therein without departing from the spirit and scope of the present inventive concept as defined by the following claims.

Exemplary embodiments can also be embodied as computer readable codes on a computer readable recording medium.

For example, the apparatus for encoding an image, the apparatus for decoding an image, the motion vector encoder, and the motion vector according to exemplary embodiments may each include a bus coupled to each element included in the apparatuses in FIGS. 1, 2, 4, 5, 9, and 14 and at least one processor combined to the bus. Also, the apparatuses may each include a memory coupled to at least one processor for executing commands by being combined to the bus in order to store the commands, received messages, or generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:

1. An image decoding apparatus comprising
a decoding unit configured to decode, from a bitstream including an image, information about motion vector difference for a current block and information about motion vector predictor for the current block;
a candidate determiner configured to generate motion vector predictor candidate group, and to modify the motion vector predictor candidate group based on vectorial values of motion vector predictor candidates in the motion vector predictor candidate group; and
a motion vector restoring unit configured to determine a motion vector predictor for the current block from among motion vector predictor candidates in the modified motion vector predictor candidate group based on the information about motion vector predictor, and to determine a motion vector for the current block based on the motion vector predictor and the information about motion vector difference,
wherein, the modified motion vector predictor candidate group includes a 1st motion vector predictor candidate and at least one of 2nd motion vector predictor candidates, the 1st motion vector predictor candidate is a motion vector of collocated block to the current block, the collocated block is located in a reference picture, the $2^{nd}$ motion vector predictor candidates are motion vectors of neighboring blocks of the current block,
wherein the neighboring blocks include blocks located in upper left side, upper right side, and lower left side of the current block,
wherein the candidate determiner modifies the motion vector predictor candidate group when at least two of $2^{nd}$ motion vector predictor candidates have the same value, by removing all of the at least two of $2^{nd}$ motion vector predictor candidates except for one of the at least two of $2^{nd}$ motion vector predictor candidates from the motion vector predictor candidate group,
wherein the image is split into a plurality of maximum coding units according to information about size of the maximum coding units, the maximum coding unit is hierarchically split into one or more coding units of depths including at least one of a current depth and a lower depth, and
wherein one of the one or more coding units of depths including at least one of the current depth and the lower depth includes the current block.

2. The apparatus of claim 1, wherein the candidate determiner modifies the motion vector predictor candidate group to include totally two motion vector predictor candidates,
wherein the candidate determiner determines one of the two motion vector predictor candidates as the motion vector predictor based on the information about motion vector predictor having 1 bit binary value.

3. The apparatus of claim 1, wherein the 1st motion vector predictor candidate is scaled based on the temporal distance between a current picture and the reference picture.

* * * * *